(12) United States Patent
Hattori et al.

(10) Patent No.: US 10,938,262 B2
(45) Date of Patent: Mar. 2, 2021

(54) MOTOR AND ELECTRIC POWER STEERING DEVICE

(71) Applicant: Nidec Corporation, Kyoto (JP)

(72) Inventors: Takashi Hattori, Kyoto (JP); Takahiro Kizu, Kyoto (JP); Toshiya Okamoto, Kyoto (JP); Yuichi Nishikawa, Kyoto (JP); Yoshiaki Yamashita, Kyoto (JP); Mitsuo Kodama, Kyoto (JP); Yuya Saito, Kyoto (JP); Shingo Fukumoto, Kyoto (JP); Chiharu Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 11 days.

(21) Appl. No.: 16/319,553

(22) PCT Filed: Mar. 30, 2017

(86) PCT No.: PCT/JP2017/013440
§ 371 (c)(1),
(2) Date: Jan. 22, 2019

(87) PCT Pub. No.: WO2018/029894
PCT Pub. Date: Feb. 15, 2018

(65) Prior Publication Data
US 2019/0267862 A1 Aug. 29, 2019

Related U.S. Application Data

(60) Provisional application No. 62/425,668, filed on Nov. 23, 2016.

(30) Foreign Application Priority Data

Aug. 12, 2016 (JP) .............................. JP2016-158338

(51) Int. Cl.
*H02K 3/50* (2006.01)
*H02K 9/22* (2006.01)
(Continued)

(52) U.S. Cl.
CPC ................. *H02K 3/50* (2013.01); *H02K 9/22* (2013.01); *H02K 11/33* (2016.01); *B62D 5/0403* (2013.01);
(Continued)

(58) Field of Classification Search
CPC ............. H02K 11/33; H02K 5/20; H02K 9/22
(Continued)

(56) References Cited

U.S. PATENT DOCUMENTS 6,779,989 B2 8/2004 Makino et al.
9,473,004 B2 10/2016 Kadoike et al.
(Continued)

FOREIGN PATENT DOCUMENTS

JP  2004-215368 A  7/2004
JP  2009-177869 A  8/2009
(Continued)

OTHER PUBLICATIONS

Kodama et al., "MOTOR", U.S. Appl. No. 16/323,037, filed Feb. 4, 2019.
(Continued)

*Primary Examiner* — Jose A Gonzalez Quinones
(74) *Attorney, Agent, or Firm* — Keating & Bennett

(57) ABSTRACT

A motor includes a rotor including a shaft extending axially, a stator surrounding a radial outside of the rotor and including a coil defined by a wound coil wire, a holder disposed on an axially upper side of the stator, the coil wire being inserted into the holder, the holder including through-holes extending axially, and a circuit board disposed on the axially upper side of the holder, an electronic component being
(Continued)

mounted on the circuit board. When the holder is viewed from the axially upper side, the through-holes are located in a region where a center angle ($\alpha$) centered on the shaft is less than or equal to 180 degrees.

8 Claims, 21 Drawing Sheets

(51) Int. Cl.
    *H02K 11/33*     (2016.01)
    *B62D 5/04*     (2006.01)

(52) U.S. Cl.
    CPC ...... *H02K 2203/06* (2013.01); *H02K 2211/03* (2013.01)

(58) Field of Classification Search
    USPC .................. 310/64, 68 R, 75 R, 98, 100, 71
    See application file for complete search history.

(56) References Cited

U.S. PATENT DOCUMENTS

| | | | |
|---|---|---|---|
| 9,893,586 B2 | 2/2018 | Tomizawa et al. | |
| 9,899,890 B2 | 2/2018 | Hiramine et al. | |
| 10,050,493 B2 | 8/2018 | Kabune | |
| 2009/0021091 A1* | 1/2009 | Shiino | H02K 3/522 310/71 |
| 2010/0201213 A1* | 8/2010 | Kataoka | H02K 3/522 310/71 |
| 2012/0286604 A1 | 11/2012 | Abe et al. | |
| 2014/0009041 A1 | 1/2014 | Kawasaki et al. | |
| 2014/0085839 A1* | 3/2014 | Nakano | H05K 5/0052 361/752 |
| 2014/0125173 A1* | 5/2014 | Hayashi | H02K 3/522 310/88 |
| 2015/0042215 A1 | 2/2015 | Murakami et al. | |
| 2015/0236570 A1* | 8/2015 | Hayashi | H02K 11/33 310/45 |
| 2015/0263593 A1* | 9/2015 | Wallner | H02K 3/28 310/71 |
| 2016/0181885 A1 | 6/2016 | Yamasaki | |
| 2018/0233984 A1* | 8/2018 | Ogawa | H02K 3/52 |
| 2018/0287462 A1 | 10/2018 | Kabune | |

FOREIGN PATENT DOCUMENTS

| | | |
|---|---|---|
| JP | 2009-278848 A | 11/2009 |
| JP | 2016-077069 A | 5/2016 |

OTHER PUBLICATIONS

Official Communication issued in International Patent Application No. PCT/JP2017/013440, dated Jun. 13, 2017.

* cited by examiner

MOTOR AND ELECTRIC POWER STEERING DEVICE

BACKGROUND OF THE INVENTION

1. Field of the Invention

The present disclosure relates to a motor and an electric power steering device.

2. Description of the Related Art

There is known an electromechanically integrated type motor in which a motor main body including a rotor and a stator and a controller including an electronic component that controls the motor main body and a circuit board are integrally disposed.

Work becomes complicated in a process of connecting an electronic component or a circuit board and a motor wire.

SUMMARY OF THE INVENTION

In view of the above problems, exemplary embodiments of the present disclosure provide motors and electric power steering devices, each of which is able to be easily assembled.

According to one aspect of an exemplary embodiment of the present disclosure, a motor includes: a rotor including a shaft extending axially; a stator surrounding a radial outside of the rotor and including a coil defined by a wound coil wire; a holder disposed on an axially upper side of the stator, the coil wire being inserted into the holder, the holder including a plurality of through-holes extending axially; and a circuit board disposed on the axially upper side of the holder, an electronic component being mounted on the circuit board. When the holder is viewed from the axially upper side, the plurality of through-holes are located in a region where a center angle centered on the shaft is less than or equal to 180 degrees.

According to an exemplary embodiment of the present disclosure, the plurality of through-holes into which the coil wire is inserted are gathered in the region where the center angle is less than or equal to 180 degrees in the holder. Consequently, a connection between the circuit board and the coil wire, which are disposed on the upper side of the holder, is able to be concentrated in the region where the center angle is less than or equal to 180 degrees. Thus, a process of connecting the electronic component or the circuit board and the motor wire is able to be simplified, so that assembly is able to be easily performed.

In a motor according to an exemplary embodiment of the present disclosure, preferably, the circuit board includes a first region where a power supply is mounted and a second region where a controller is mounted, and the plurality of through-holes are located in the first region when viewed from the axially upper side.

Consequently, circuit design is able to be classified into a power side and a control side, so that the disposition of the electronic component is able to be simplified. When the motor is connected to a connector, a structure around the connector is also able to be simplified.

In a motor according to an exemplary embodiment of the present disclosure, preferably, the first region is a region where the center angle centered on the shaft is less than or equal to 180 degrees when viewed from the axial upper side.

In this way, an area where heat is released to the holder is able to be widened by widening the first region where the power element is mounted, so that heat dissipation is able to be enhanced.

In a motor according to an exemplary embodiment of the present disclosure, preferably, a number of slots of the coil is greater than or equal to 6, a number of phases is 3, and the center angle is less than or equal to (360 degrees/the number of slots)×3 degrees.

Consequently, when the number of slots of the coil is large, the connection between the circuit board and the coil wire is able to be concentrated in a narrower region. Thus, the simplified connection process is able to be performed, so that the assembly is able to be easily performed.

In a motor according to an exemplary embodiment of the present disclosure, preferably, only a plurality of in-phase coil wires among the coil wires are inserted into each of the plurality of through-holes, and the plurality of through-holes are holes separated from each other in each phase of the coil wire.

The coil wires inserted into the through-holes separated from each other are in-phase, the in-phase coil wires located in the through-holes need not to be insulated from each other. Consequently, a size of each through-hole is able to be reduced by bringing the in-phase coil wires closer to each other. Thus, in a motor of an exemplary embodiment of the present disclosure in which a large space where the electronic component is disposed is able to be secured, preferably, the plurality of through-holes are circumferentially provided at intervals.

Because the through-holes are arranged along the circumferential direction, the through-holes are located on the outer side as compared with the case that the through-holes are provided in a tangential direction. Thus, the coil wire and the electronic component are able to be easily connected to each other.

Because a stator core has an annular shape, a coil lead wire is also drawn out side by side in the circumferential direction. At this point, work to insert the coil lead wire into the through-hole is simplified by circumferentially arranging the through-holes in a similar manner, so that the motor is able to be more easily assembled.

When the through-holes are circumferentially provided at intervals, an area inside the through-holes is able to be widened as compared with the case that the through-holes are provided in the tangential direction. Thus, the space where the electronic component is disposed inside the through-holes is able to be widely secured.

In a motor according to an exemplary embodiment of the present disclosure, preferably, the holder is a heat sink including a contact surface contacting directly with the circuit board or the electronic component or contacting indirectly with the circuit board or the electronic component with a heat dissipating member interposed therebetween and an exposed surface that does not contact with another member, the exposed surface is located circumferentially outside the plurality of through-holes, and a boundary between the contact surface and the exposed surface is located circumferentially.

The contact surface with the circuit board or the electronic component in the holder is able to be widened by locating the exposed surface on the outer circumferential side, so that a heat dissipation effect is able to be enhanced.

In a motor according to an exemplary embodiment of the present disclosure, preferably, the holder is the heat sink including a circuit board abutment abutting axially on the circuit board, and the plurality of through-holes and the circuit board abutment are provided with an interval in the circumferential direction.

This prevents deformation of the circuit board even if stress is applied during connection between the coil wire and the circuit board.

In a motor according to an exemplary embodiment of the present disclosure, preferably, a plurality of the circuit board abutments are provided, and the two circuit board abutments and the through-holes located at both ends in the circumferential direction among the plurality of through-holes are provided with an interval in the circumferential direction.

Consequently, the coil wire and the circuit board are able to easily be connected to each other, so that the assembly is able to be more easily performed.

An electric power steering device according to an exemplary embodiment of the present disclosure includes any one of the above motors.

Because the electric power steering device according to an exemplary embodiment of the present disclosure includes one of the above motors, the assembly is able to be easily performed.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, exemplary embodiments of the present disclosure will be described with reference to the drawings. In the following drawings, an identical or corresponding component is denoted by an identical reference sign, and the description will not be repeated.

Figure 1:
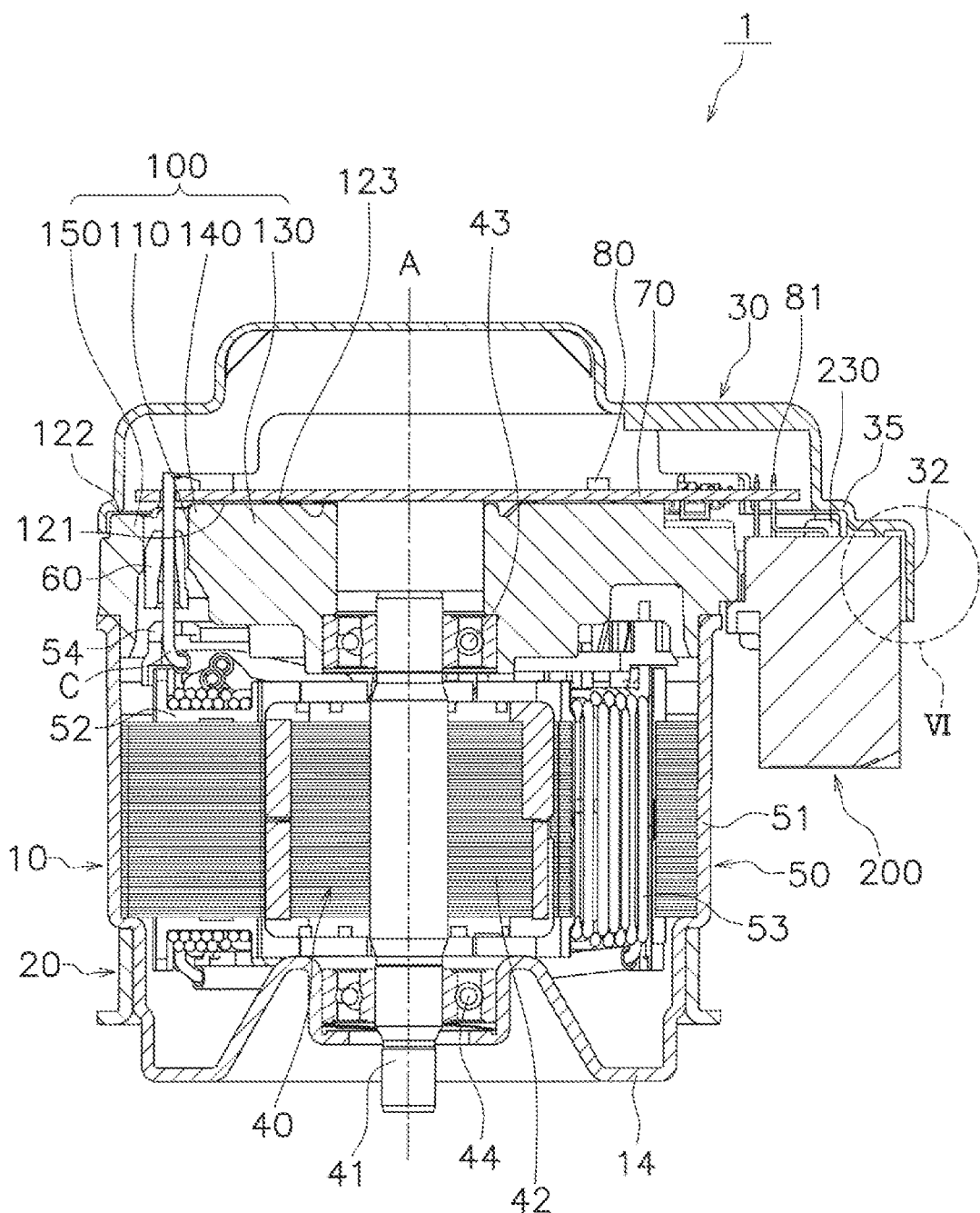
FIG. 1 is a sectional view illustrating a motor according to a first exemplary embodiment of the present disclosure.

In the following description, as illustrated in FIG. 1, a center axis A of a rotor, namely, an axial direction in which a shaft extends is defined as a vertical direction, a circuit board side is defined as an upper side, and a bottom side of a housing is defined as a lower side. However, the vertical direction in the description is used to specify a positional relationship, but does not limit an actual direction. That is, a downward direction does not necessarily mean a gravity direction.

A direction orthogonal to the center axis A of the rotor is a radial direction, and the center axis A is set to a center in the radial direction. A circumferential direction is set around the center axis A of the rotor.

The term "extending in the axial direction" means the case of strictly extending in the axial direction and the case of extending in a direction inclined within a range less than 45 degrees with respect to the axial direction. Similarly, the term "extending in the radial direction" includes the state of strictly extending in the radial direction and the state extending in the direction within the range less than 45 degrees with respect to the axial direction.

In the description, the term "being fitted (fitting)" means that objects having shapes matched with each other are fitted to each other. The objects having shapes matched with each other includes the case that the shapes are identical to each other, the case that the shapes are similar to each other, and the case that the shapes are different from each other. In the case that the objects having shapes matched with each other have an uneven shape, at least a portion of a protrusion is located in a recess.

In the description, the term "gap" means a gap intentionally provided. That is, a gap designed so as not to bring structural elements into contact with each other is defined as the gap.

A motor according to a first exemplary embodiment of the present disclosure will be described with reference to FIGS. 1 to 27. A motor according to a first exemplary embodiment includes two systems including two pairs of a U-phase, a V-phase, and a W-phase.

As illustrated in FIG. 1, the motor 1 includes a housing 10, a flange 20, a cover 30, a rotor 40, bearings 43 and 44, a stator 50, a coil support 60, a controller including a circuit board 70 and an electronic component 80, a heat sink 100, and a connector 200.

As illustrated in FIG. 1, the housing 10 accommodates the rotor 40, the stator 50, and the bearings 43, 44 therein. The housing 10 extends axially, and is open upward.

Figure 2:
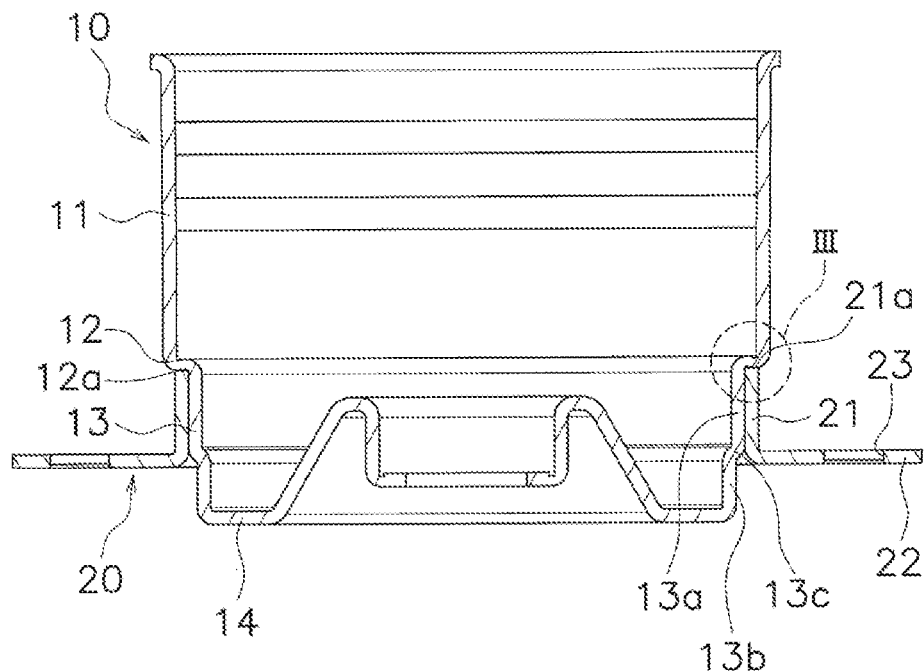
FIG. 2 is a sectional view illustrating a housing and a flange of the first exemplary embodiment of the present disclosure.

As illustrated in FIG. 2, the housing 10 includes a first tube 11, a contactor 12, a second tube 13, and a bottom 14. The housing 10 of the first exemplary embodiment is a press-molded product. The first tube 11, the contactor 12, the second tube 13, and the bottom 14 have an identical thickness. The term "identical" means that the object is not intentionally provided with a different thickness, and a difference in thickness due to drawing in press molding and the like is regarded to be identical.

The first tube 11 and the second tube 13 have a tubular shape with the center axis A as the center. The tubular shape is a hollow shape, and may be a circular shape or a polygonal shape in planar view. The first tube 11 accommodates the stator 50 therein.

The contactor 12 extends radially inward from a lower end in the axial direction of the first tube 11. The stator 50 contacts with an inside upper surface of the contactor 12.

Figure 3:
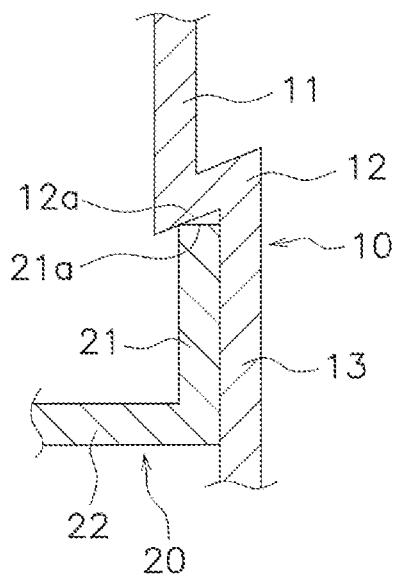
FIG. 3 is an enlarged view illustrating a region corresponding to a region III in FIG. 2 in a motor according to a modification of the first exemplary embodiment of the present disclosure.
Figure 4:
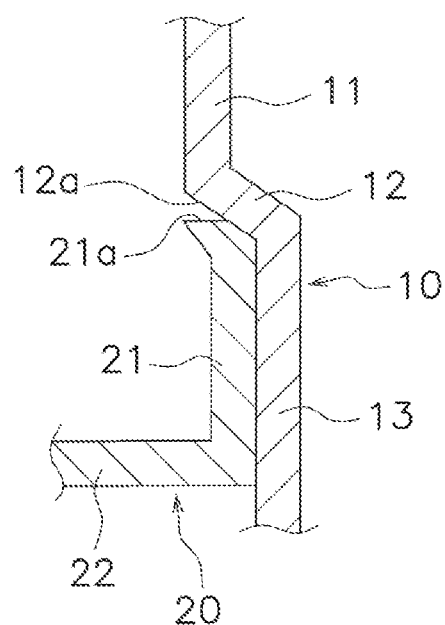
FIG. 4 is a view illustrating another modification of FIG. 3.

A housing lower surface 12a of the contactor 12 is a flat surface extending radially as illustrated in FIG. 2. The housing lower surface 12a of the contactor 12 may extend axially upward as it extends radially inward from the first tube 11 as illustrated in FIG. 3, and the housing lower surface 12a may extend axially downward as it extends radially inward from the first tube 11 as illustrated in FIG. 4. The housing lower surface 12a of the contactor 12 may be a curved surface (not illustrated).

The second tube 13 is a tubular shape that extends axially downward from a radially inner end of the contactor 12 and has an outer diameter smaller than that of the first tube 11. The second tube 13 includes an upper tube 13a, a lower tube 13b, and a connector 13c. The lower tube 13b has an outer diameter smaller than that of the upper tube 13a. The connector 13c connects the upper tube 13a and the lower tube 13b.

The bottom 14 extends radially inward from an axially lower end of the second tube 13. The bottom 14 closes the housing 10.

As illustrated in FIGS. 1 and 2, the flange 20 is attached to an outside surface of the housing 10.

As illustrated in FIG. 2, the flange 20 includes a flange tube 21 and a flange flat body 22. The flange 20 of the first exemplary embodiment is a press-molded product. The flange tube 21 and the flange flat body 22 have an identical thickness.

The flange tube 21 is fixed to the outside surface of the second tube 13 of the housing 10. The flange tube 21 has a tubular shape with the center axis A as the center, and the outer diameter of the flange tube 21 is larger than that of the second tube 13. An axial length of the flange tube 21 is shorter than that of the second tube 13.

As illustrated in FIGS. 2 and 3, the outside side surface and the inside side surface of the flange tube 21 may extend along the axial direction. As illustrated in FIG. 4, in the flange tube 21, upper portions of the outside surface and the inner surface may be inclined.

The flange flat body 22 extends radially outward from the axially lower end of the flange tube 21. The flange flat body 22 protrudes radially outward from the first tube 11 when viewed from the axially upper side. The flange flat body 22 includes a fixing hole 23 in order to fix the flange flat body 22 to an external device of the motor 1 at a plurality of positions.

As illustrated in FIGS. 1 to 4, an upper end 21a of the flange tube 21 contacts with the housing lower surface 12a of the contactor 12 of the housing 10. That is, at least a portion of the upper end 21a of the flange tube 21 and at least a portion of the housing lower surface 12a of the contactor 12 contact with each other.

In a contact structure of FIG. 2, the housing lower surface 12a of the contactor 12 is a flat surface extending radially, and the upper end 21a of the flange tube 21 is a flat surface extending radially, and at least a portion of the flat surface of the contactor 12 and at least a portion of the flat surface of the flange tube 21 contact with each other.

In the contact structure of FIG. 3, the contactor 12 extends axially upward as it extends radially inward from the first tube 11. Because the upper end 21a of the flange tube 21 is the flat surface extending radially, a corner portion between an upper end surface and the inside surface of the flange tube 21 enters the contactor 12. Thus, the housing 10 hardly comes off from the flange 20.

In the contact structure of FIG. 4, the contactor 12 extends axially downward as it extends radially inward from the first tube 11. The upper end 21a of the flange tube 21 contacts with the housing lower surface 12a of the contactor 12, and extends axially outward along the contactor 12. Thus, the housing 10 hardly comes off from the flange 20.

Figure 5:
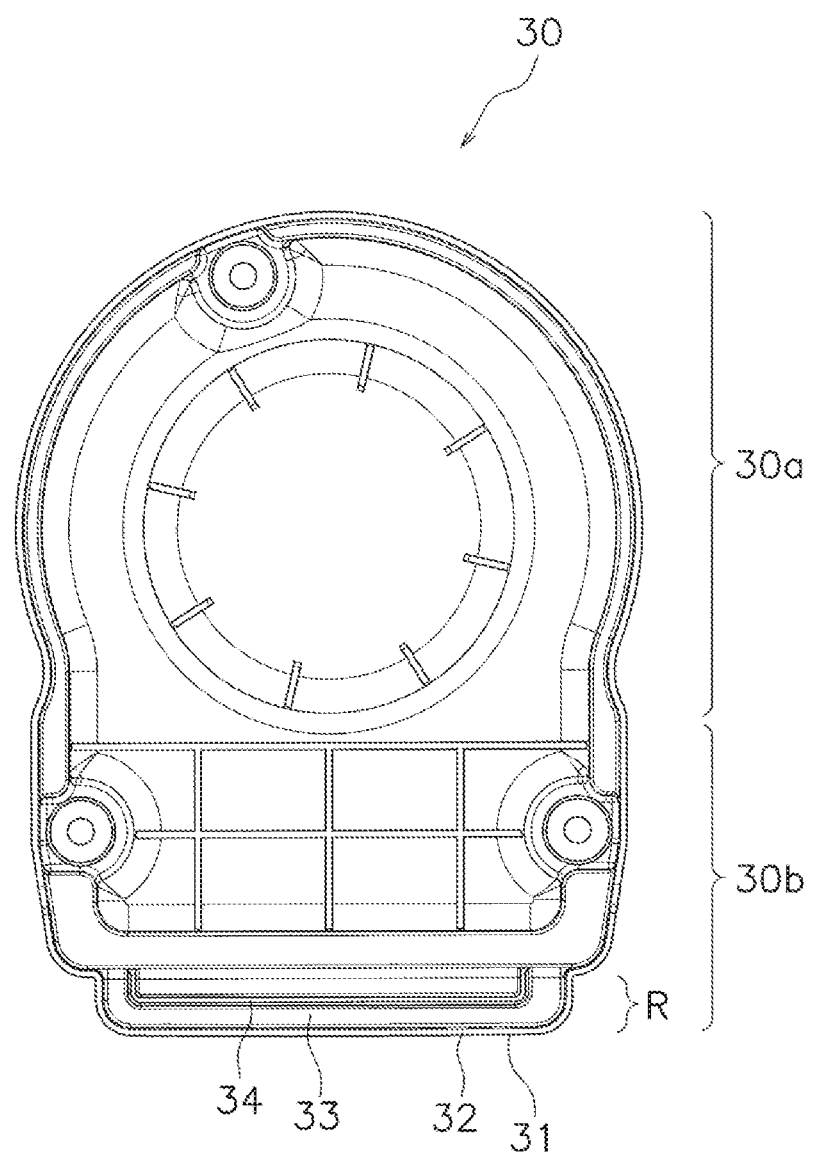
FIG. 5 is a bottom view illustrating a cover of the first exemplary embodiment of the present disclosure.

As illustrated in FIG. 1, the cover 30 covers at least portions of axially upper sides of the circuit board 70 and the connector 200. As illustrated in FIG. 5, the cover 30 includes a disc-shaped unit 30a that overlaps the housing 10 when viewed from the axially upper side and a rectangular unit 30b opposed to the connector 200. The rectangular unit 30b includes an outer end region R including a cover outer end edge 31 that is a radially outer end edge. The term "cover outer end region 31" means an outer end (an end of the cover 30), and the term "outer end region R" means a predetermined region that includes the cover outer end edge 31 and extends inward from the cover outer end edge 31.

Figure 6:
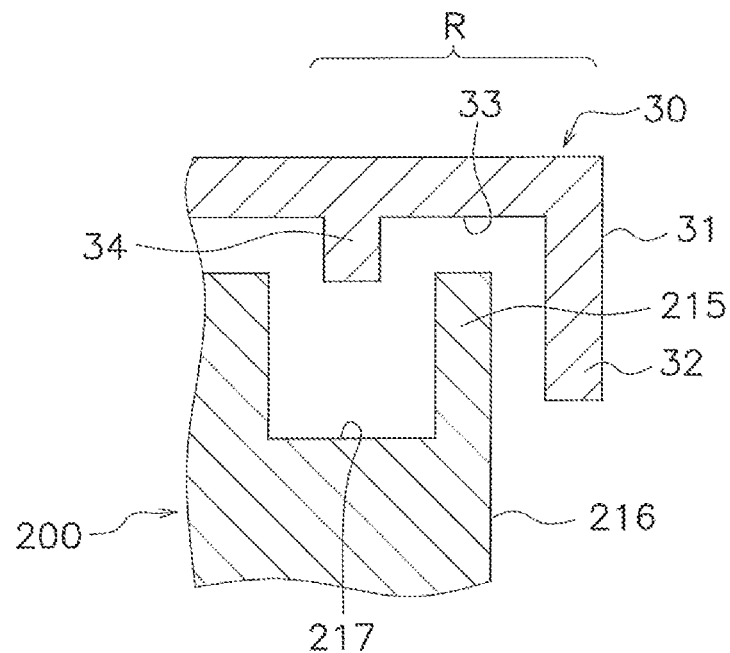
FIG. 6 is an enlarged view illustrating a region VI in FIG. 1.

As illustrated in FIGS. 5 and 6, the cover 30 includes a covering wall 32, a cover recess 33, a cover protrusion 34, and a cover step 35 (see FIG. 1).

The covering wall 32 extends axially downward from the cover outer end edge 31 that is the radially outer end edge, and covers at least a portion of a connector outer end edge 216 that is the radially outer end edge of the connector 200 (to be described later).

The cover recess 33 is located radially inside the covering wall 32, and axially recessed. As illustrated in FIG. 6, the axially upper side of the cover recess 33 is a flat surface. The cover recess 33 in FIG. 6 is defined by the radially inside surface of the covering wall 32 and the radially outside surface of the cover protrusion 34.

The cover protrusion 34 extends axially downward on the radial inside with respect to the cover recess 33. Specifically, the cover protrusion 34 extends in a longitudinal direction (a right and left direction in FIG. 5) of the connector, and further extends in a crosswise direction (a vertical direction in FIG. 5) from both ends in the longitudinal direction. As illustrated in FIG. 6, the axially lower side of the cover protrusion 34 is a flat surface. The lower surface of the cover protrusion 34 is located below the circuit board 70. The lower surface of the cover protrusion 34 is located at an axial height identical to that of a top surface of the connector protrusion 215 (to be described later) or below the top surface of the connector protrusion 215.

The cover step 35 is located radially inside the cover protrusion 34, and recessed axially upward.

The cover recess 33, the cover protrusion 34, and the cover step 35 include a plurality of flat surfaces, but may include a curved surface.

Figure 7:
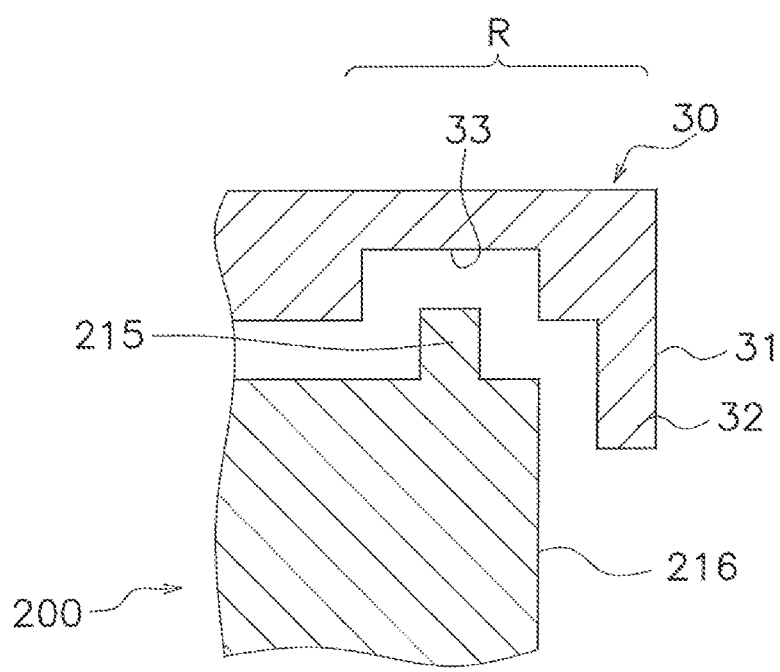
FIG. 7 is a view illustrating a modification of FIG. 6.
Figure 8:
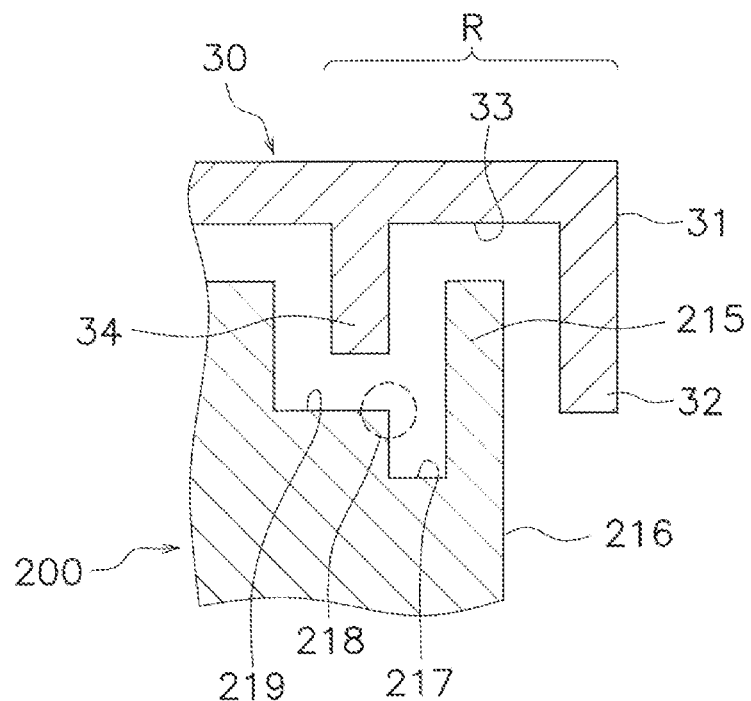
FIG. 8 is a view illustrating another modification of FIG. 6.
Figure 9:
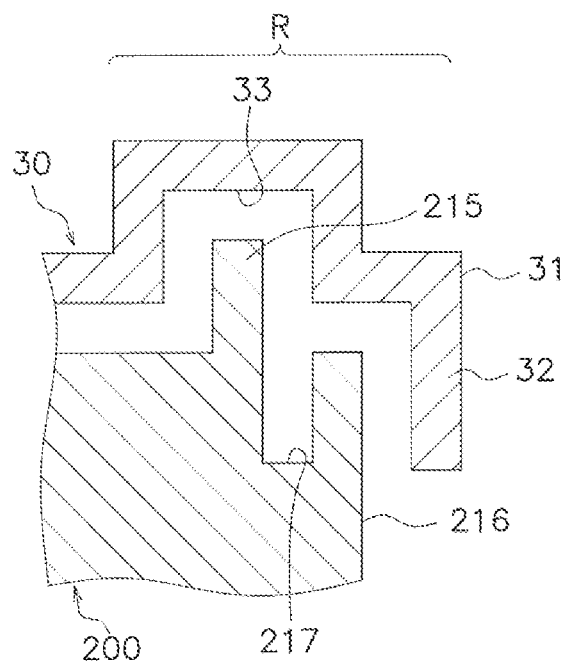
FIG. 9 is a view illustrating still another modification of FIG. 6.

Modifications of the structure of the outer end region R of the cover 30 will be described with reference to FIGS. 7 to 9. In FIG. 7, the cover recess 33 is not constructed with the inside surface of the covering wall 32, but is recessed axially upward with a space from the covering wall 32. In FIG. 8, protrusion lengths in the axial direction of the covering wall 32 and the cover protrusion 34 are substantially identical to each other. In FIG. 9, a step structure is provided between the covering wall 32 and the cover recess 33.

As illustrated in FIG. 1, the rotor 40 includes a shaft 41 and a rotor core 42. The shaft 41 has a substantially columnar shape with the center axis A extending axially as the center. The rotor core 42 is fixed to the shaft 41. The rotor core 42 surrounds the radial outside of the shaft 41. The rotor core 42 rotates together with the shaft 41.

As illustrated in FIG. 1, the bearings 43, 44 rotatably support the shaft 41. The bearing 43 disposed on the axially upper side is located on the axially upper side of the stator 50, and held by the heat sink 100. The bearing 44 disposed on the axially lower side is held by the bottom 14 of the housing 10.

As illustrated in FIG. 1, the stator 50 surrounds the radial outside of the rotor 40. The stator 50 includes a stator core 51, an insulator 52, a coil 53, a bus bar B, and a bus bar holder 54.

The stator core 51 includes a plurality of core backs and a plurality of teeth 51b (see FIG. 10), which are arranged in the circumferential direction. The core back has a tubular shape concentric with the center axis A. The tooth 51b extends radially inward from the inside surface of the core back. The plurality of teeth 51b are provided, and extend radially from the core backs, and are arranged with a gap (slot) in the circumferential direction.

As illustrated in FIG. 1, the insulator 52 covers at least a portion of the stator core 51. The insulator 52 is made of an insulator, and attached to each tooth 51b.

The coil 53 excites the stator core 51, and is formed by winding a coil wire C. Specifically, the coil wire C is wound around each tooth 51b with the insulator 52 interposed therebetween, and the coil 53 is disposed in each tooth 51b. That is, the coil wire C is concentrated winding. In the first exemplary embodiment, the coil wire C is what is called double arc winding in which the coil wire C is wound around two different teeth 51b in a concentrated winding manner. The coil wire C is located radially inside the radially outside end of the bus bar holder 54.

Figure 10:
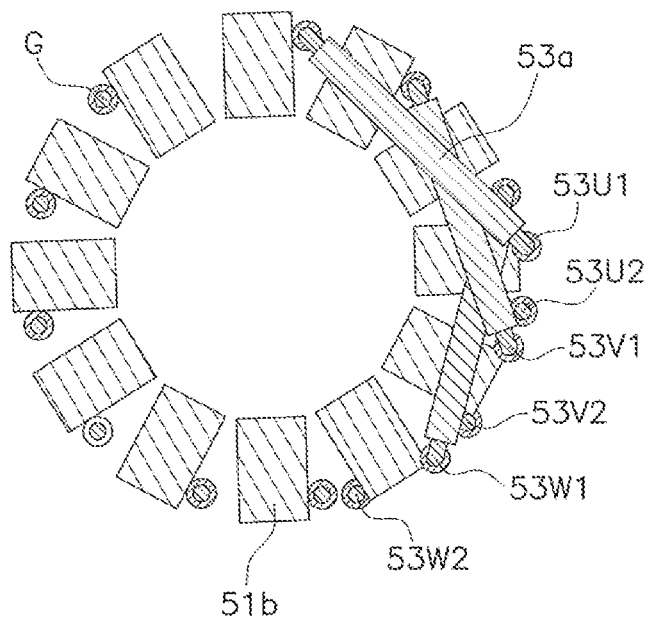
FIG. 10 is a schematic diagram illustrating a stator of the first exemplary embodiment of the present disclosure.

One end of the coil wire C is connected to the bus bar B. The other end of the coil wire C is inserted into a coil support 60 (to be described later), and connected to the circuit board 70. The other end of the coil wire C of the first exemplary embodiment is a conducting wire drawn from the coil 53. Specifically, as illustrated in FIG. 10, the conducting wire is six lead wires 53U1, 53U2, 53V1, 53V2, 53W1, 53W2 defining the U-phase, the V-phase, and the W-phase in each of first and second systems. The lead wires 53U1, 53U2, 53 V1, 53V2, 53 W1, 53W2 drawn from the stator 50 are inserted into through holes 65 (see FIG. 12) of the coil support 60 and a heat sink through-hole 110 (see FIG. 17), and electrically connected to the controller by a method such as soldering.

The lead wires 53U1, 53U2, 53 V1, 53V2, 53 W1, 53W2 are gathered in the region less than or equal to 180 degrees centered on the shaft by a crossover 53a.

In driving the motor 1, current is passed through the lead wires 53U1, 53V1, 53W1 defining the U-phase, V-phase and W-phase in the first system, and current is also passed through the lead wires 53U2, 53V2, 53W2 defining, the U-phase, the V-phase, and the W-phase. With this configuration, even if the energization to the coil of one system is stopped due to, for example, failure of an inverter in driving the motor 1, the coil of the other system is able to be energized, so that the motor 1 is able to be driven.

Although the motor 1 of the first exemplary embodiment has the two-system configuration of the two pairs of the U phase, the V phase, and the W phase, any number of systems is able to be designed. That is, the motor 1 may be one system or at least three systems.

The bus bar B is made of a conductive material electrically connecting the coil wires led out from the coil 53 to each other. The bus bar B of the first exemplary embodiment is a neutral point bus bar in star connection.

Figure 11:
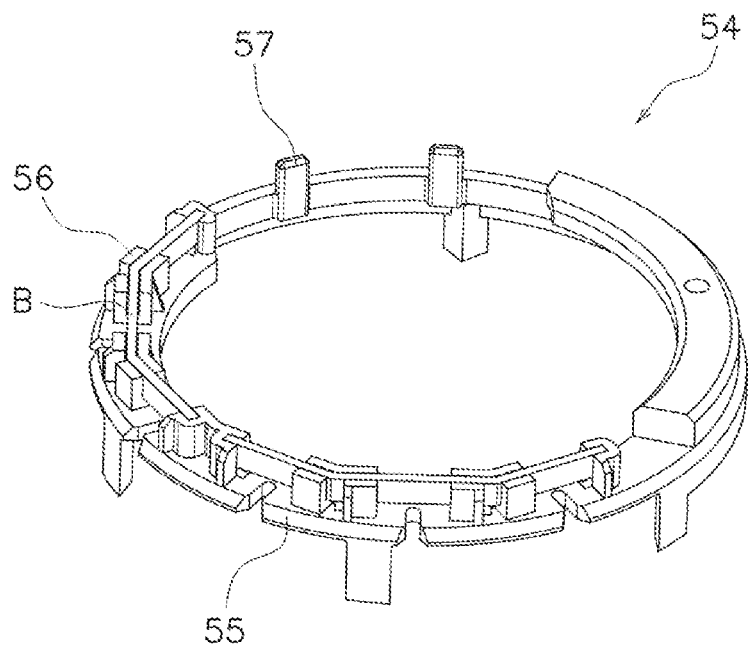
FIG. 11 is a perspective view illustrating a bus bar holder of the first exemplary embodiment of the present disclosure.

The bus bar holder 54 in FIG. 11 holds the bus bar B. The bus bar holder 54 is made of an insulating material. As illustrated in FIG. 1, the bus bar holder 54 is fixed to the axial outside of the insulator 52 or the axially upper side of the core back. The bus bar holder 54 and the bearing 43 radially overlap each other.

As illustrated in FIG. 11, the bus bar holder 54 includes a ring-shaped base 55, a holder 56 holding the bus bar B, and a bus bar protrusion 57. The bus bar protrusion 57 and the holder 56 extend axially upward from a portion of the base 55, and are provided at different positions in the circumferential direction.

The stator 50 includes a stator fitter that is a protrusion or a recess extending axially. In the first exemplary embodiment, the stator fitter is a bus bar protrusion 57 that is provided in the bus bar holder and extending axially. The stator fitter may be a recess (not illustrated) that is provided in the bus bar holder 54 and recessed axially downward. The stator fitter may be a protrusion or a recess located at the upper end of the stator core 51, the insulator 52, or the like.

As illustrated in FIG. 1, the coil support 60 supports a conductor such as the coil wire C. The coil support 60 is made of an insulating material. The coil support 60 is disposed axially above the stator 50, and the coil wire C is inserted in the coil support 60.

Figure 12:
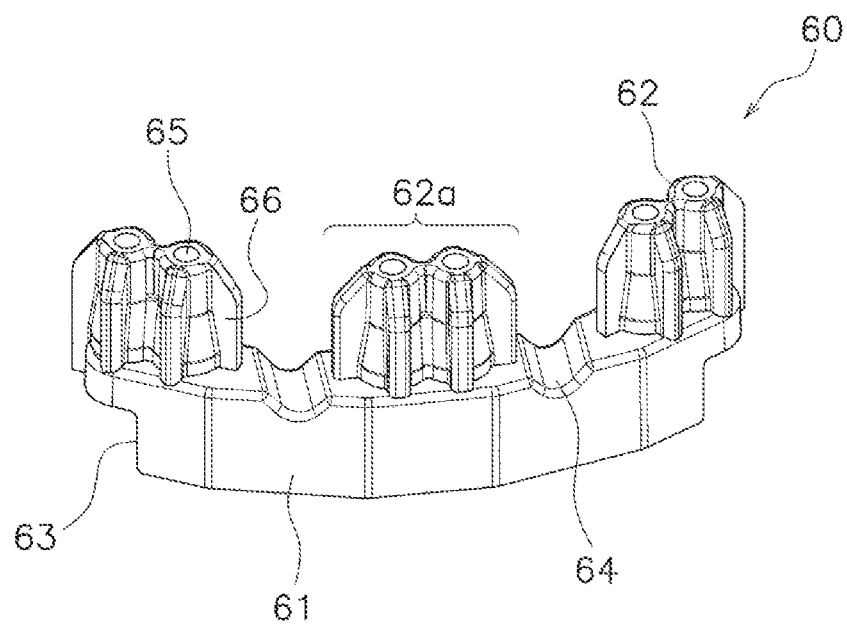
FIG. 12 is a perspective view illustrating a coil support of the first exemplary embodiment of the present disclosure.

As illustrated in FIG. 12, the coil support 60 includes a base 61 and a coil support 62 extending axially upward from the base 61.

Figure 13:
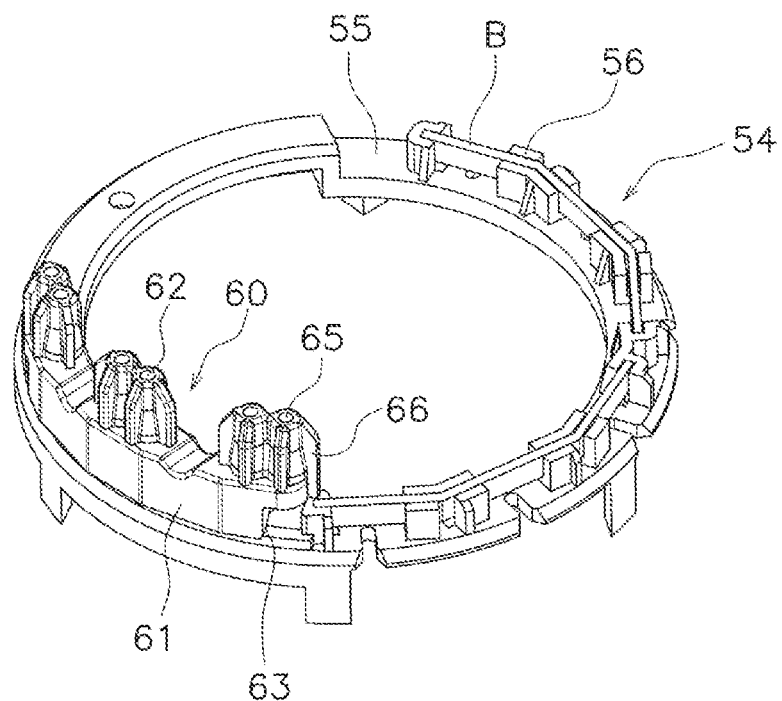
FIG. 13 is a perspective view illustrating the bus bar holder and the coil support of the first exemplary embodiment of the present disclosure.
Figure 14:
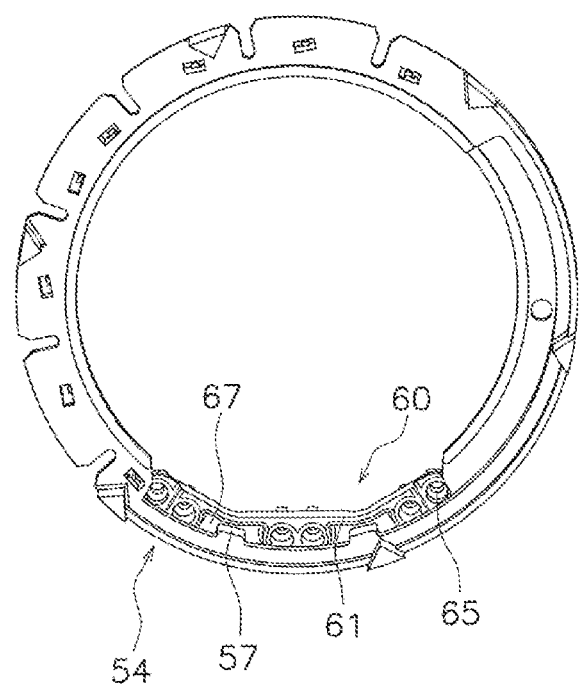
FIG. 14 is a bottom view illustrating the bus bar holder and the coil support of the first exemplary embodiment of the present disclosure.

The base 61 is disposed on the top surface of the stator 50. In the first exemplary embodiment, the stator fitter is provided in the bus bar holder 54. Thus, as illustrated in FIGS. 13 and 14, the base 61 is located on the top surface of the bus bar holder 54. The base 61 is located on the top surface of the stator core 51 in the case that the stator fitter is provided in the stator core 51, and the base 61 is located on the insulator 52 in the case that the stator fitter is provided in the insulator 52.

As illustrated in FIGS. 12 and 13, a notch 63 is provided on an axially lower side of the base 61 and at both circumferential ends of the base 61. The notch 63 are cut out axially upward from the bottom surface at both circumferential ends.

The base 61 includes a groove 64 that is provided at the upper end and extending radially. The groove 64 is located axially above the upper end surface of the housing 10.

The radially outer surface of the base 61 is defined by a plurality of surfaces. In the first exemplary embodiment, there are five radially outer surfaces of the base 61. The radially outer surface of the base 61 may have a curved shape or the like.

The coil support 62 includes the through-hole 65 into which the coil wire is inserted. The coil wire of the first exemplary embodiment is six lead wires 53U1, 53U2, 53 V1, 53V2, 53 W1, 53W2 defining the U-phase, V-phase, and W-phase in each of the first and second systems. Because one lead wire is held by one through-hole 65, six coil supports 62 including the through-holes 65 are provided on the base 61. In the first exemplary embodiment, in the coil support 62 into which the in-phase coil wire is inserted, a protrusion 62a is adjacent to the coil support 62 with no use of a gap. That is, the protrusion 62a includes a portion defining the through-hole 65 into which the in-phase coil wire is inserted and a rib 66 (to be described later). The protrusion 62a exists for each of the U-phase, the V-phase, and the W-phase, and the protrusions 62a are arranged in parallel at intervals.

At least a portion of the coil support 62 is located in a heat sink through-hole 110 (to be described later). A width of the coil support 62 in FIG. 12 is equal to or gradually larger than a width of the heat sink through-hole 110 from the axially upper side toward the lower side. The width on the upper side of the coil support 62 is smaller than that on the lower side. The coil support 62 has a tapered shape toward the upper side.

The coil support 62 includes the rib 66 extending in a direction intersecting the axial direction. In the first exemplary embodiment, the protrusion 62a includes a rib extending to both circumferential sides of the protrusion 62a and a rib extending from both through-hole 65 to both radial sides. For this reason, each protrusion 62a includes six ribs 66. The width of the rib 66 is equal to or gradually smaller than that of the heat sink through-hole 110 from the axially lower side to the upper side, and the width of the upper end is smaller than that of the lower end. For this reason, the shape of the coil support 62 including the rib 66 of the first exemplary embodiment is tapered axially upward. The protrusion 62a also has a shape tapered axially upward.

As illustrated in FIG. 14, the base 61 is fitted in the stator 50 with a gap interposed therebetween. The base 61 and the stator 50 may contact partially with each other, and preferably the base 61 and the stator 50 may be disposed with the gap in a direction perpendicular to the axial direction (including the radial direction and the circumferential direction). In the latter case, the entire coil support 60 is able to move with respect to the stator 50 in assembling the motor 1. In the first exemplary embodiment, the base portion 61 and the stator 50 are disposed with a gap in the circumferential direction.

The base portion 61 includes a coil support fitter 67 that is a recess or a protrusion extending axially. The recess and the protrusion of the stator fitter and the coil support fitter 67 are fitted in each other with the gap interposed therebetween.

The radial width of the recess of the stator fitter or the coil support fitter 67 is larger than that of the protrusion of the coil support fitter 67 or the stator fitter. The circumferential width of the recess of the stator fitter or the coil support fitter 67 is larger than that of the protrusion of the coil support fitter 67 or the stator fitter. The stator fitter is the protrusion, the coil support fitter 67 is the recess, and preferably the stator fitter and the coil support fitter 67 are fitted to each other with the gap in the circumferential direction. In other words, the stator 50 includes the protrusion extending axially, the base 61 includes recess extending axially, the protrusion of the stator 50 and the recess of the base 61 are circumferentially fitted to each other, and the circumferential width of the recess of the base 61 is larger than that of the protrusion of the stator 50.

In the first exemplary embodiment, the coil support fitter 67 is the recess located in the base 61, and the stator fitter is the bus bar protrusion 57 in the bus bar holder 54.

In this way, the coil support 60 is positioned at a predetermined position by fitting the stator 50 and the coil support 60 in an uneven shape. The stator 50 and the coil support 60 are fitted to each other with the gap interposed therebetween, which allows the position of the coil support 60 to be adjusted by the width of the gap. Consequently, the heat sink 100 is able to be inserted while the position of the coil support 60 is adjusted, so that assembly is facilitated. The uneven relationship may be reversed so as to satisfy the above function.

Because the bus bar and the coil lead wire need to be fixed by welding, the bus bar holder 54 needs to be fixed as a portion of the stator 50. On the other hand, the coil support 60 may move as long as the coil lead wire is able to be positioned.

The coil support fitter 67 is located between the adjacent coil supports 62 in the base 61. In other words, the coil support fitter 67 is located between the adjacent protrusions 62a in the base 61. The coil support fitter 67 is located in the surface on the axially lower side of the base 61, and extends along the circumferential direction (parallel arrangement direction).

The controller controls a motor main body including the rotor 40 and the stator 50, and includes the circuit board 70 and the electronic component 80 mounted on the circuit board 70 as illustrated in FIG. 1. The circuit board 70 is disposed axially above the stator 50 so as to spread radially, and fixed to the axially upper side of the heat sink 100. The electronic component 80 is mounted on at least one of the top surface and the bottom surface of the circuit board 70.

Figure 15:
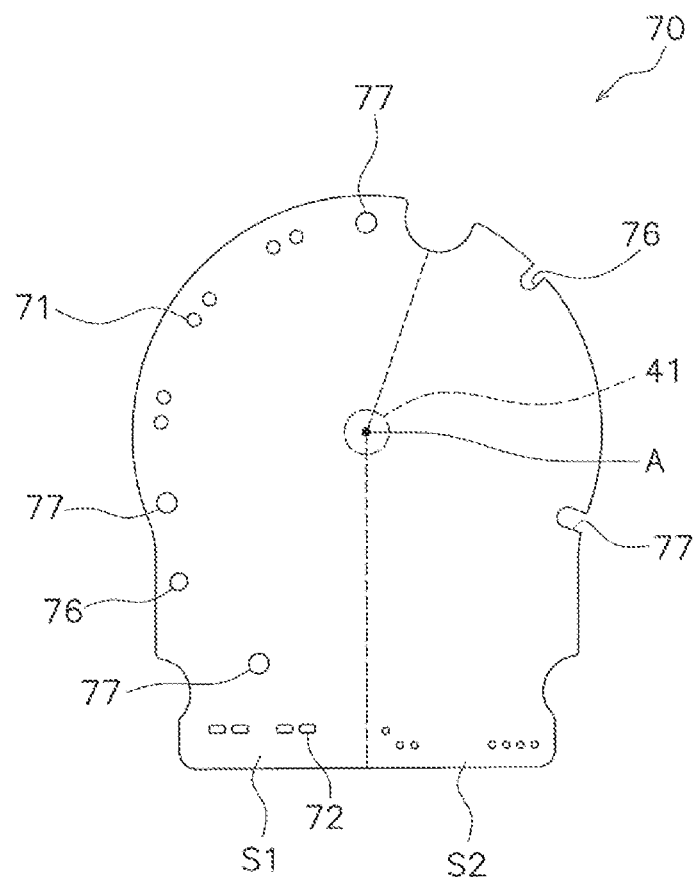
FIG. 15 is a bottom view illustrating a circuit board of the first exemplary embodiment of the present disclosure.

As illustrated in FIG. 15, the circuit board 70 includes a first region S1 on which a power element is mounted and a second region S2 on which a control element is mounted. When viewed from the axially upper side, the first region S1 is a region larger than or equal to 180 degrees centered on the center axis A of the shaft 41.

At this point, the first region S1 and the second region S2 are able to be defined when the power element and the control element are separately disposed on the circuit board 70 in the circumferential direction. Thus, this shall not apply to the case that the power element and the control element are irregularly scattered on the circuit board 70 or the case that the power element and the control element are disposed in the identical circumferential direction while radially separated.

The first region S1 and the second region S2 are regions defined by an angle centered on the shaft 41 (center axis A).

For example, in the first region S1, the radial outside of the circuit board 70 is regarded as the first region S1 even if the power element is biased toward the radial inside of the circuit board 70.

As used herein, the power element is an element on a circuit that connects the coil wire to an external power supply, and the control element is an element on a circuit that connects a signal line detected by a magnetic sensor to the external control device. Examples of the power element include a choke coil, a FET (Field Effect Transistor), and a capacitor. A microcomputer can be cited as an example of the control element.

As illustrated in FIG. 15, the circuit board 70 includes circuit board through-holes 71, 72 into which a conductor is inserted. The conductor is connected to the circuit board 70 to distribute electric power. Examples of the conductor include a connector pin 81 (see FIG. 1) and the coil wire C wound around the stator 50. In the first exemplary embodiment, the coil wire is inserted into the circuit board through-hole 71, and the connector pin 81 is inserted into the circuit board through-hole 72. The coil wire C and the circuit board 70, and the connector pin 81 and the circuit board 70 are fixed by soldering.

Figure 16:
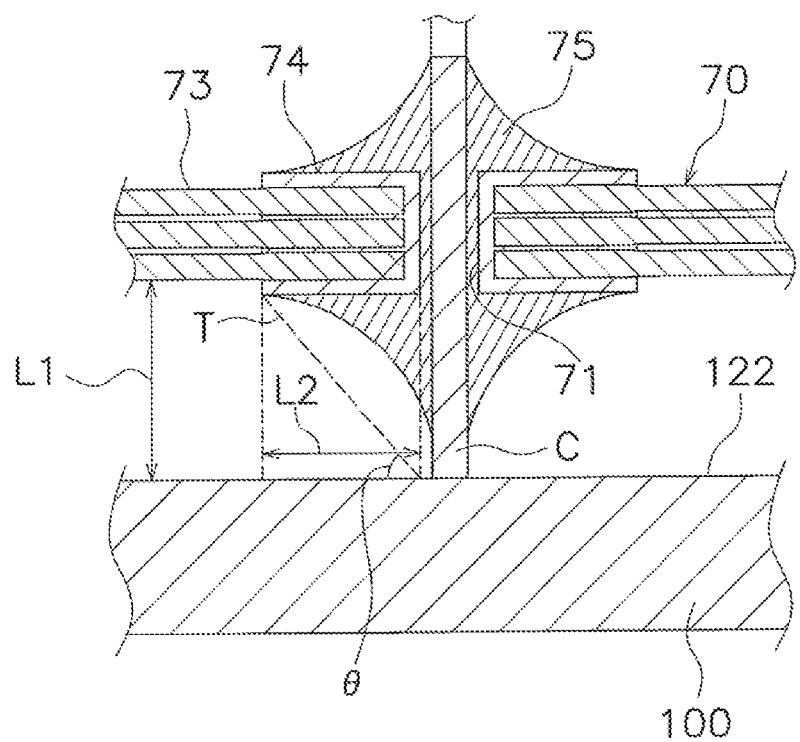
FIG. 16 is a sectional view illustrating the circuit board and a conductor of the first exemplary embodiment of the present disclosure.

Specifically, as illustrated in FIG. 16, the circuit board 70 includes a printed board 73 and a land 74 surrounding the circuit board through-hole 71 in the printed board 73. The lands 74 are located on the top surface and the bottom surface of the printed board 73 and the inside surface of the circuit board through-hole 71.

As illustrated in FIG. 15, a positioning hole 76 corresponding to a second positioning recess 176 (see FIG. 17) of the heat sink 100 is made in the circuit board 70 for the purpose of the positioning with the heat sink 100. The positioning hole 76 is a round hole, a notched hole, or the like.

A fixing hole 77 corresponding to a fixing hole 177 (see FIG. 17) of a heat sink main body 103 is made in order to fix the heat sink 100 to the circuit board 70. The fixing hole 77 is a round hole, a notched hole, or the like.

A first positioning hole 178 penetrates a heat sink top surface 101 and a heat sink bottom surface 102. In processing the heat sink top surface 101, the second positioning recess 176 is formed based on the first positioning hole 178. Similarly, in processing the heat sink bottom surface 102, a first positioning recess 179 is formed with reference to the first positioning hole 178. Consequently, the positions of the first positioning recess 179 and the second positioning recess 176 are decided based on the first positioning hole 178.

Thus, the position of the connector 200 in which the position is decided by the first positioning recess 179 and the position of the circuit board 70 in which the position is decided by the second positioning recess 176 are decided, which allows the connector pin 81 to be connected without causing a positional shift between the heat sink 100 and the connector 200.

The circuit board 70 or the electronic component 80 and the conductor (the circuit board 70 and the coil wire C in FIG. 16) are connected to each other by a connector 75. The connector 75 is a conductive adhesive, solder, or the like, and solder is used in the first exemplary embodiment. The solder is disposed so as to be continuous to the top surface and the bottom surface of the circuit board 70 and the inside of the circuit board through-hole 71 into which the conductor is inserted. The whole solder is located axially above an exposed surface 122 (see FIG. 1) of the heat sink 100 (to be described later).

As illustrated in FIG. 1, the heat sink 100 is disposed on the axially upper side of the stator 50, and axially opposed to the circuit board 70.

The heat sink 100 absorbs heat from the electronic component 80 mounted on the circuit board 70 and discharges heat to the outside, and is made of a material having low thermal resistance.

Because the heat sink 100 holds the bearing 43, the heat sink 100 is also used as a bearing holder. In the first exemplary embodiment, the bearing holder and the heat sink are integrated, so that the number of components, the number of assemble points, and cost associated with them are able to be reduced. The thermal resistance that is generated when the bearing holder and the heat sink are separately formed is prevented, so that the heat is able to be easily transmitted to the outside.

Figure 17:
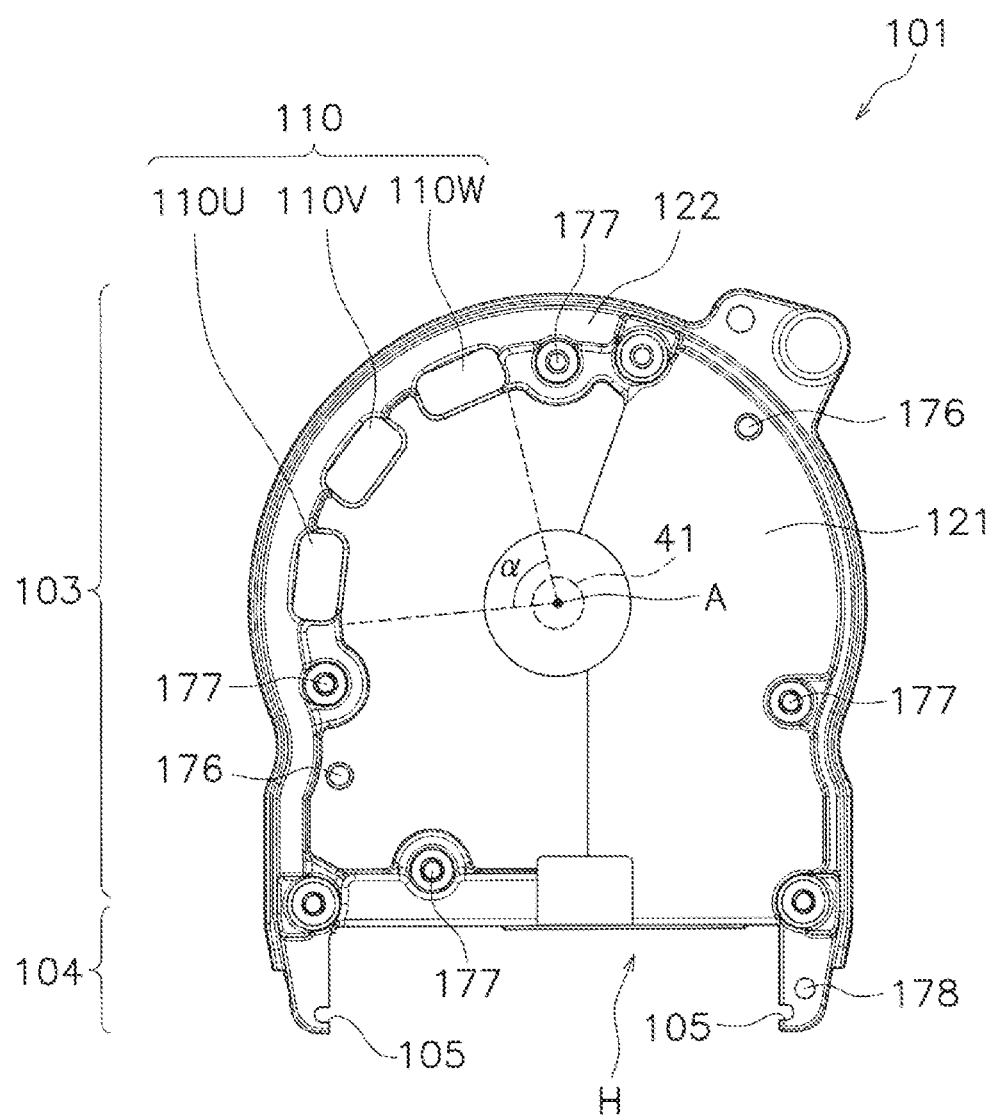
FIG. 17 is a plan view illustrating a heat sink of the first exemplary embodiment of the present disclosure.
Figure 18:
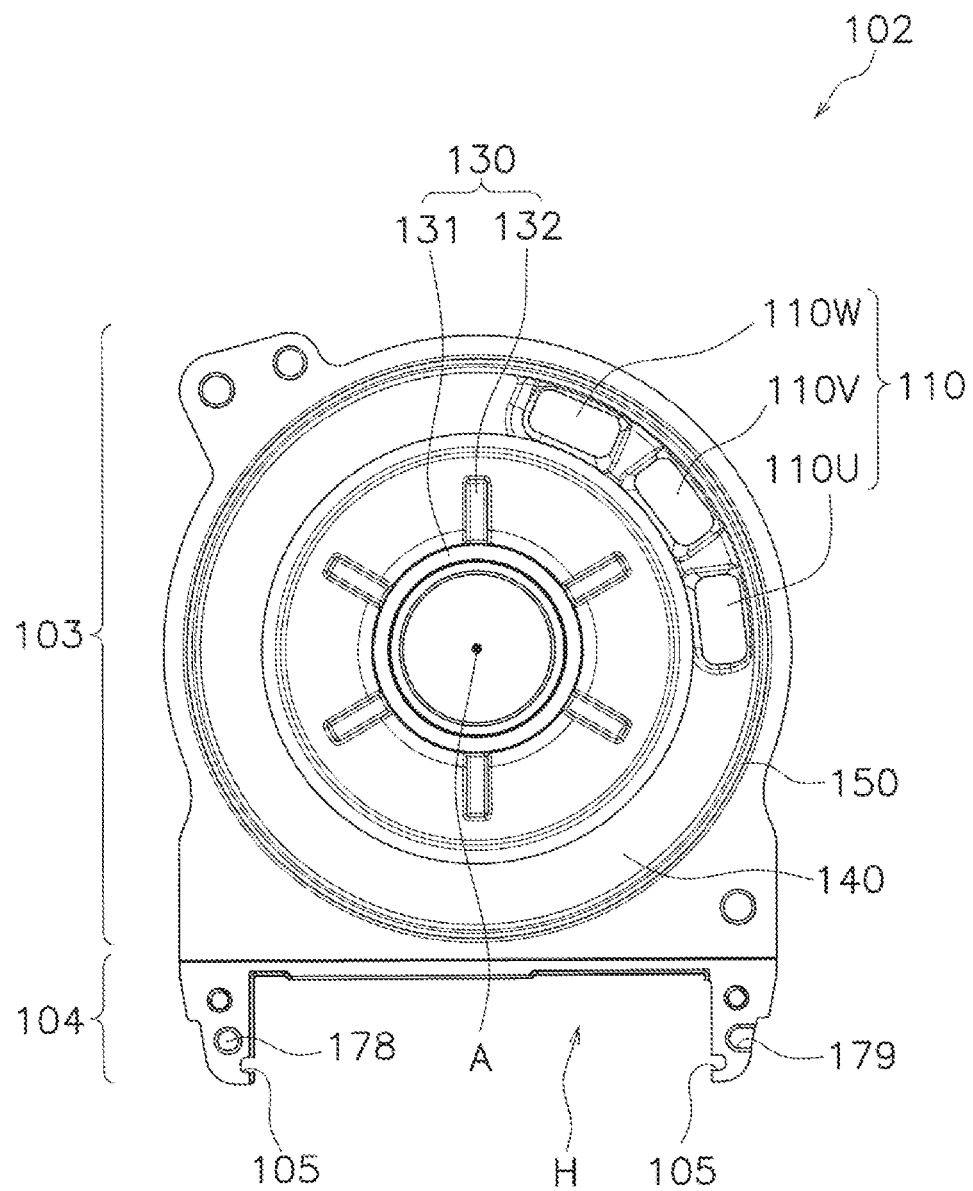
FIG. 18 is a bottom view illustrating the heat sink of the first exemplary embodiment of the present disclosure.

The heat sink 100 includes a heat sink top surface 101 in FIG. 17 and a heat sink bottom surface 102 in FIG. 18. The heat sink top surface 101 is opposed to the circuit board 70, and the heat sink bottom surface 102 is opposed to the stator 50.

As illustrated in FIGS. 17 and 18, the heat sink 100 includes a heat sink main body 103 and a heat sink protrusion 104 that is continuous to the heat sink main body 103 and extends radially outward with respect to the housing 10.

When viewed from the axially upper side, the heat sink main body 103 overlaps with the housing 10 accommodating the rotor and the stator 50. The heat sink protrusion 104 protrudes radially from the heat sink main body 103, and covers at least a portion in the longitudinal direction of the connector 200 (the right and left direction in FIGS. 17 and 18).

A plurality of heat sink protrusions 104 in FIGS. 17 and 18 are formed with a space interposed therebetween. More specifically, the heat sink protrusion 104 protrudes from one end and the other end (the upper end of and the lower end in FIG. 19A) of the radially outer end edge (the right end of the heat sink main body 103 in FIG. 19A) of the heat sink main body 103 on the side of the connector 200.

Figure 19A:
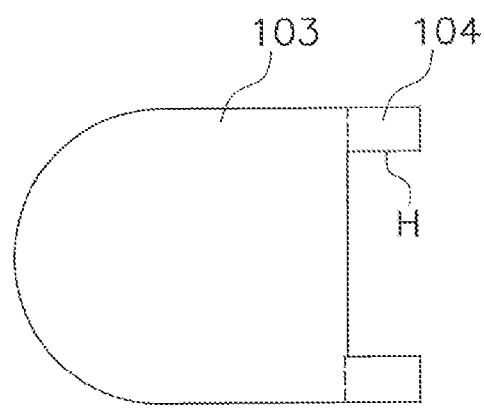
FIG. 19A is a plan view schematically illustrating the heat sink in FIG. 17, and FIGS. 19B and 19C are views illustrating modifications of FIG. 19A.
Figure 19B:
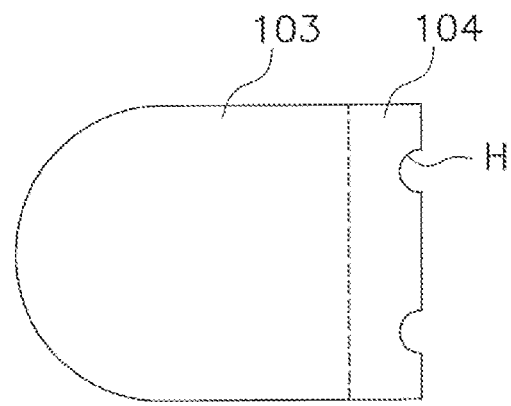
Figure 19C:
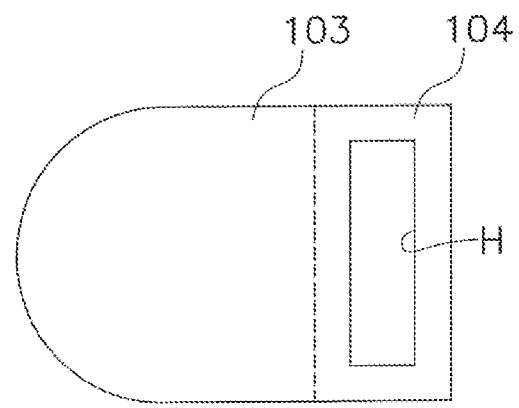

At this point, as illustrated in FIG. 19A, the heat sink protrusion 104 has a shape protruding like a bar in planar view, and the heat sink protrusion 104 and the heat sink main body 103 define a substantially U-shape in the case that the heat sink protrusion 104 is installed only at both ends. The heat sink protrusion 104 may have a shape protruding like a plate as illustrated in FIG. 19B, a ring shape as illustrated in FIG. 19C, or the like. In the case that the heat sink protrusion 104 has the shape protruding like the bar in planar view, the number of the heat sink protrusions 104 may be one or at least three, and the heat sink protrusions 104 may not be provided at both ends.

The heat sink protrusion 104 includes a heat sink recess or an axially extending heat sink protrusion in order to be fitted in the connector 200 (to be described later). The heat sink recess or the heat sink protrusion extends along the axial direction. In FIGS. 17 and 18, a heat sink recess 105 is located in the inside surface of the heat sink protrusion 104 located at one end and the other end in the longitudinal direction of the connector 200. The inside surface of the heat sink protrusion 104 is a surface opposed to the connector 200.

In the first exemplary embodiment, the heat sink protrusion 104 is the exposed surface 122 (see FIG. 1). That is, a gap is provided between the heat sink protrusion 104 and the circuit board 70. Thus, whether the connector pin 81 is connected to the circuit board 70 is able to be visually checked from the longitudinal direction of the connector 200 in a pre-process of attaching the cover 30.

An axially extending cavity H into which the conductor is inserted is located in the heat sink 100. The cavity H is a through hole, a notch, or the like.

In the case that the conductor is the connector pin 81 or the like, the cavity H into which the conductor is inserted in the structures in FIGS. 17 and 18 and FIG. 19A schematically illustrating the connector pin 81 or the like is constructed with the heat sink main body 103 and the two heat sink protrusions 104. Specifically, the cavity H is defined by the radially outer end edge of the heat sink main body 103 on the connector side and two heat sink protrusions 104.

In a structure including a notch at the radially outer end of the heat sink protrusion 104 in FIG. 19B according to a modification, the notch defines the cavity H. In a structure in which the heat sink protrusion 104 in FIG. 19C according to another modification has a ring shape, the ring-shaped hollow hole defines the cavity H.

In the case that the conductor is the coil wire from the stator 50, as illustrated in FIGS. 17 and 18, an axially extending heat sink through-hole 110 into which the coil wire is inserted is formed as the cavity H.

As described above, the cavity H of the heat sink 100 in FIGS. 17 and 18 is the cavity for the conductor from the connector defined by the radially outer end surface of the heat sink main body 103 and the inner end surfaces of the two heat sink protrusions 104 and the heat sink through-hole 110 for the coil wire.

Figure 20:
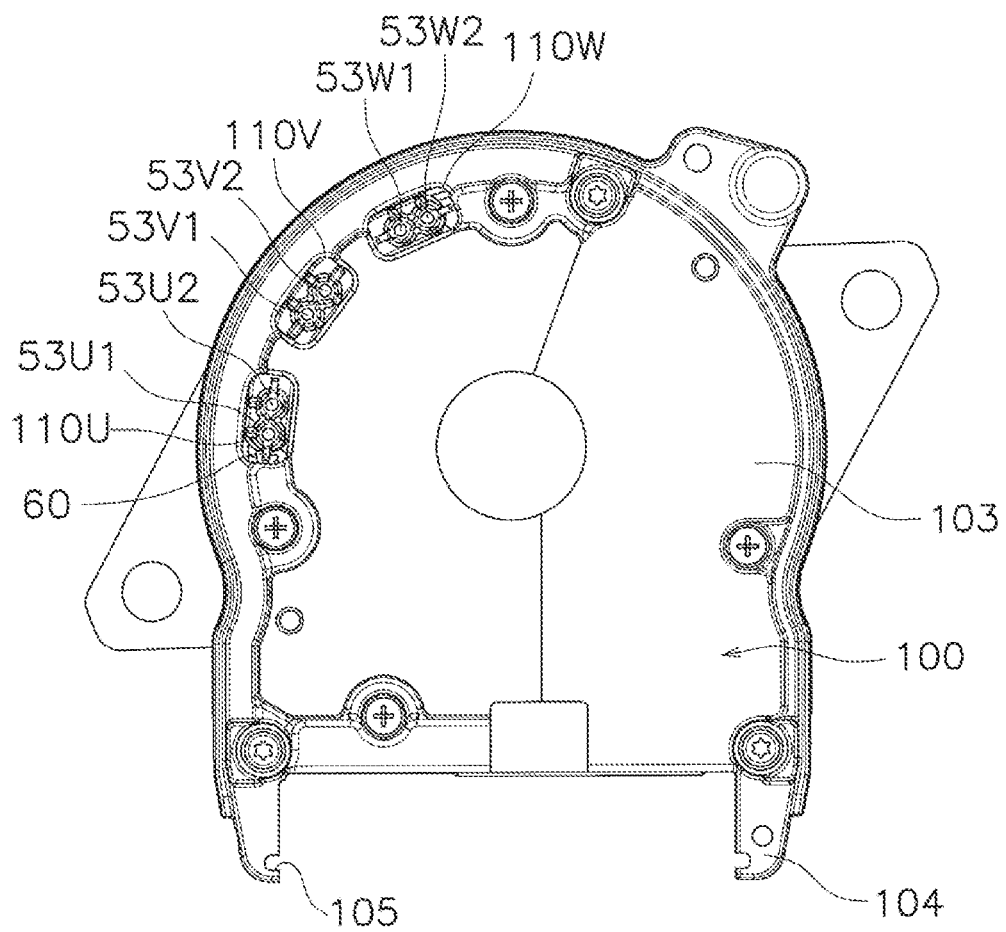
FIG. 20 is a plan view illustrating the coil support supporting a coil wire and a heat sink of the first exemplary embodiment of the present disclosure.

As illustrated in FIGS. 17, 18, and 20, the heat sink through-hole 110 extends axially while the conductors such as the coil wire is inserted into the heat sink through-hole 110. Consequently, the heat sink through-hole 110 is able to position the conductor. As illustrated in FIGS. 1 and 20, the heat sink through hole 110 of the first exemplary embodiment holds the coil support 60 that supports the coil wire.

A plurality of heat sink through-holes 110 are located so as to be circumferentially adjacent to each other. Specifically, the plurality of heat sink through-holes 110U, 110V, 110W are circumferentially provided at intervals. That is, the plurality of heat sink through-holes 110U, 110V, 110W are aligned on a concentric circular arc with a space interposed therebetween.

As illustrated in FIG. 17, when viewed from the axially upper side, the plurality of heat sink through-holes 110U, 110V, 110W are located in a region where the center angle α centered on the shaft 41 (center axis A) falls within 180 degrees. That is, the heat sink through holes 110U, 110V, 110W are collectively arranged on one side. Preferably the number of slots is at least 6, the number of phases is 3, and the center angle α is less than or equal to "(360 degrees/the number of slots)×3".

The term "phase" in the above expression means the number of independent coils of the fixed stator, and the three-phase motor having the number of phases of 3 is a motor including three independent coils at 120-degree intervals, and is the three-phase motor having the U-phase, the V-phase, and the W-phase in the first exemplary embodiment. The term "slot" in the above formula means the number of grooves between the teeth, and is a multiple of 3 in the three-phase motor. In the first exemplary embodiment, because of 12 slots of 3 phases, preferably the center angle α is less than or equal to 90 degrees.

Similarly to the heat sink through-holes 110U, 110V, 110W, desirably the coil lead wires 53U1, 53U2, 53 V1, 53V2, 53 W1, 53W2 are located within the center angle α. The coil lead wire is able to be located within the center angle α using the crossover 53a.

As illustrated in FIG. 20, only a plurality of the identical-phase coil wires among the coil wires are inserted into each of the plurality of heat sink through holes 110U, 110V, 110W. That is, one protrusion 62a of the coil support 60 is held in each of the heat sink through-holes 110U, 110V, 110W. The plurality of heat sink through-holes 110U, 110V, 110W are holes separated from each other in each phase of the coil wire. That is, the plurality of heat sink through holes 110U, 110V, 110W are independent of one another, but are not connected to one another. Particularly, only the lead wires 53U1, 53U2 that are two U-phase coils are inserted into the heat sink through-hole 110U. Only the lead wires 53V1, 53V2 that are two V-phase coils are inserted into the heat sink through-hole 110V. Only the lead wires 53W1, 53W2 that are two W-phase coils are inserted into the heat sink through-hole 110W.

When viewed from the axially upper side, the heat sink through-holes 110U, 110V, 110W are opposed to the first region S1 where the power element is mounted in the circuit board 70. For this reason, the heat sink through-holes 110U, 110V, 110W into which the coil wires are inserted are located in the first region S1 where the power element of the circuit board 70 is mounted.

When viewed from the axially upper side, the heat sink through-holes 110U, 110V, 110W have the structure extending over the first region S1 where the power element is mounted and the second region S2 where the control element is mounted. When viewed from the axially upper side, a structure in which a portion of the heat sink through hole is the first region S1 and the remaining part is the second region S2 may be adopted.

Figure 21:
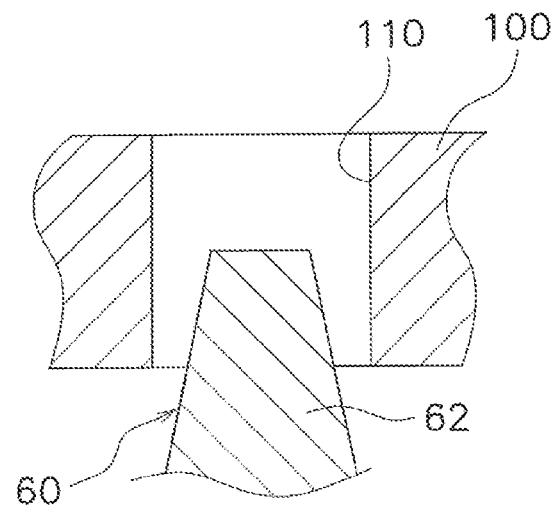
FIG. 21 is a sectional view illustrating a heat sink through-hole and the coil support of the first exemplary embodiment of the present disclosure.
Figure 22:
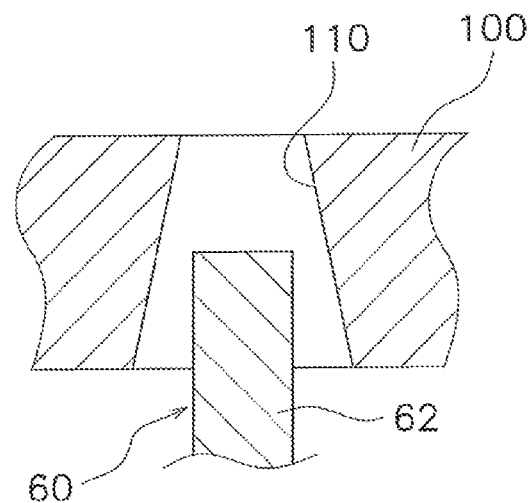
FIG. 22 is a view illustrating a modification of FIG. 21.

As illustrated in FIG. 1, at least a portion of the coil support 62 is located in the heat sink through-hole 110. As illustrated in FIGS. 1, 21, and 22, the gap between the coil support 62 and the heat sink through-hole 110 decreases or does not change as it extends downward.

Specifically, as illustrated in FIG. 21, the width at the upper end of the coil support 62 is smaller than the width at the lower end of the heat sink through-hole 110, and the width of the coil support 62 is equal or gradually increases from the axial upper side to the axially lower side. More specifically, the width of the heat sink through-hole 110 is kept constant, and the side surface of the coil support 62 has a tapered shape spreading downward.

As illustrated in FIG. 22, the width at the lower end of the heat sink through-hole 110 is larger than the width at the upper end of the coil support 62, and the width of the heat sink through-hole 110 is equal or gradually decreases from the axially lower side to the axially upper side. More specifically, the heat sink through hole 110 has a tapered shape spreading downward, and the width of the side surface of the coil support 62 is kept constant.

In FIGS. 21 and 22, the width at the upper end of the heat sink through-hole 110 is larger than the width of the coil support 62. Alternatively, the width at the upper end of the heat sink through-hole 110 may be smaller than the width of the coil support 62.

As described above, the gap between the coil support 62 and the heat sink through-hole 110 is equal or increases as it extends from the lower side to the upper side, so that the heat sink through-hole 110 is able to be easily inserted from the upper side of the coil support 60 in assembling the motor 1.

Figure 23:
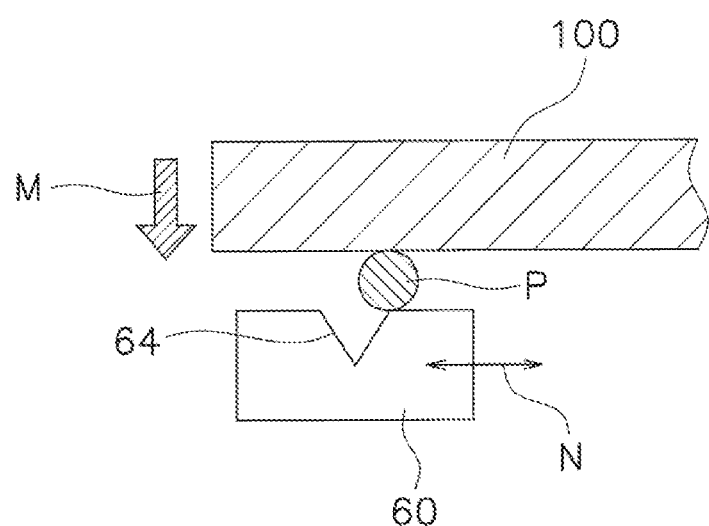
FIG. 23 is a schematic diagram illustrating a process of inserting the heat sink from above into the coil support of the first exemplary embodiment of the present disclosure.

When inserted from the upper side of the coil support 60, the heat sink 100 is able to be easily positioned by the groove 64 (see FIG. 12) of the coil support 60. The reason is as follows. As illustrated in FIG. 23, when the heat sink 100 is inserted into the coil support 60 from the axially upper side as indicated by an arrow M while a pin P is inserted in the vicinity of the groove 64 in the upper end surface of the base 61, because the heat sink 100 presses the pin P, the pin P moves to the groove 64. The coil support 60 moves according to the pressing of the pin P as indicated by an arrow N, so that the heat sink 100 and the coil support 60 can be positioned. The coil support 62 is inserted into the heat sink through-hole 110, and the position is decided. The groove 64 is located axially above the upper end surface of the housing 10, so that the inserted pin P can easily be pulled out.

As illustrated in FIG. 1, the heat sink 100 includes a contact surface 121 and an exposed surface 122. The contact surface 121 and the exposed surface 122 are surfaces located on the top surface of the heat sink 100 in FIG. 17.

The contact surface 121 contacts directly with the circuit board 70 or the electronic component 80, or contacts with the circuit board 70 or the electronic component 80 with a heat dissipator 123 interposed therebetween. The heat dissipator 123 is a member, such as grease, which has heat dissipation. The heat dissipator 123 contacts with the heat sink 100 and the circuit board 70. The exposed surface 122 is exposed without contacting with the circuit board 70, the electronic component 80, and the heat dissipator. In other words, the exposed surface 122 is disposed with a gap interposed between the exposed surface 122 and the circuit board 70 or the electronic component 80. That is, the contact surface 121 contacts directly or indirectly with the circuit board 70 or the electronic component 80, and the exposed surface 122 does not directly or indirectly contact with the member.

As illustrated in FIG. 17, the exposed surface 122 is located on the outer edge side with respect to the cavity H (in FIG. 17, the heat sink through-hole 110). In the first exemplary embodiment, the plurality of heat sink through-holes 110 are provided along the circumferential direction, so that the exposed surface 122 is located radially outside the heat sink through-hole 110. A boundary between the contact surface 121 and the exposed surface 122 is circumferentially located. In FIG. 17, the boundary between the contact surface 121 and the exposed surface 122 is located on an arc of a center angle α connecting the heat sink through-hole 110U located at one end, the heat sink through-hole 110W located at the other end, and the center axis A.

The gap is located between the circuit board 70 and the electronic component 80 and the heat sink 100 by the exposed surface 122, so that the connection between the circuit board 70 or the electronic component 80 and the conductor is able to be visually checked. When the connection is checked from the upper surface of the circuit board 70, preferably the connection is checked from the lower surface side of the circuit board 70 because the connection by the connector to the inside of the circuit board through-hole 71 and the lower surface of the circuit board 70 is not clear.

Figure 24A:
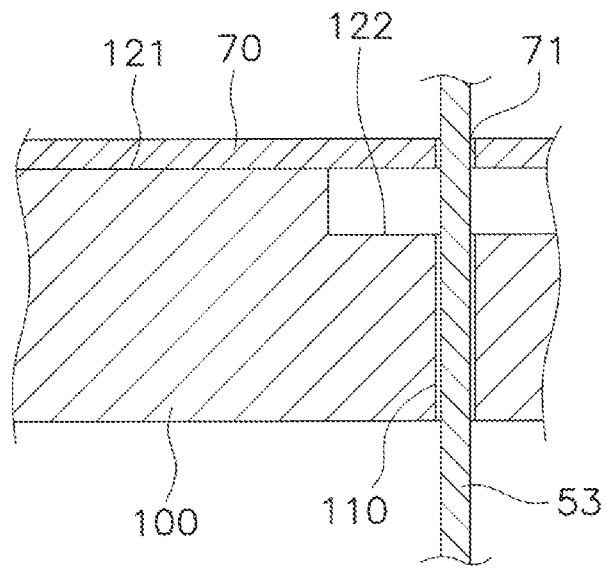
FIG. 24A is a schematic diagram illustrating the heat sink and the circuit board.
Figure 24B:
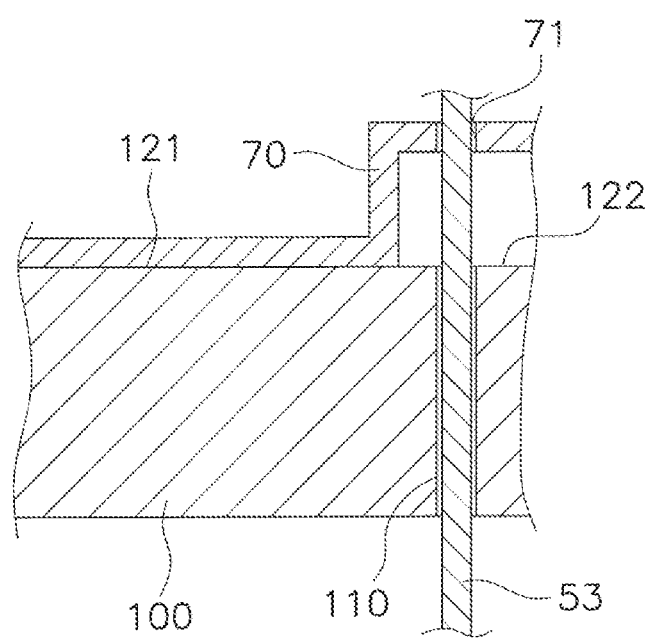
FIG. 24B is a view illustrating a modification of FIG. 24A.

In the heat sink 100 of FIG. 1, the exposed surface 122 is located axially below the contact surface 121. FIG. 24 schematically illustrates the relationship between the vicinity of the boundary between the exposed surface 122 and the contact surface 121 and the circuit board 70. As illustrated in FIG. 24A, the circuit board 70 may have a plate shape extending flatly, and the exposed surface 122 may be located below the contact surface 121. As illustrated in FIG. 24B, the circuit board 70 may have a step structure, and the exposed surface 122 and the contact surface 121 may be located on the identical plane.

The contact surface 121 may include a first contact surface that contacts directly with the circuit board 70 or the electronic component 80 and a second contact surface that contacts with the circuit board 70 or the electronic component 80 with the heat dissipator 123 interposed therebetween.

In order to check the shape of the lower end (back fillet) of the connector that connects the electronic component 80 or the circuit board 70 and the conductor, preferably the gap between the circuit board 70 or the electronic component 80 and the exposed surface 122 is larger than the gap between the circuit board 70 or the electronic component 80 and the second contact surface. Preferably the gap between the circuit board 70 or the electronic component 80 and the exposed surface 122 is increased from the viewpoint of preventing the gap for the grease applied to the second contact surface from being thinned and preventing the connector from intruding the exposed surface 122 to hardly see the exposed surface 122. When the coil support 60 is shifted upward, the lower end of the connector is hardly seen, so that preferably the gap is sufficiently ensured.

As illustrated in FIG. 16, for example, a dimension L1 between the exposed surface 122 of the heat sink 100 and the bottom surface of the circuit board 70 (or the electronic component) is larger than a dimension L2 between the circuit board through-hole 71 and the outer end of the land 74 as a dimension of the gap.

Preferably, the angle θ defined between the exposed surface 122 and an imaginary line T connecting the outer end of the land 74 and an intersection position of the coil wire C and the exposed surface 122 is greater than or equal to 45 degrees.

As illustrated in FIG. 1, in the case that a leading end of the member supporting the conductor (in the first exemplary embodiment, the coil support 60) is located at the axially height identical to that of the exposed surface or below the exposed surface, the lower end of the connector can easily be checked. On the other hand, in the case that the leading end of the member supporting the conductor is located at the axially height identical to that of the exposed surface 122 or below the exposed surface 122, the connector connecting the circuit board 70 or the electronic component 80 and the conductor is able to be prevented from being conducted to the heat sink 100.

As illustrated in FIG. 1, the heat sink 100 includes an inside region 130, an outside region 140 located radially outside the inside region 130, and an outside wall 150 located radially outside the outside region 140.

At least a portion of the inside region 130 axially overlaps the electronic component 80. An axial thickness of the inside region 130 is greater than an axial thickness of the outside region 140.

In the first exemplary embodiment, because the heat sink through-holes 110U, 110V, 110W are located in the radially outside region of the circuit board 70, the electronic components are densely packed in the radially inside region of the circuit board 70. Consequently, the heat of the electronic component is released to the heat sink 100 by increasing the axial thickness of the inside region 130 of the heat sink 100. A space in which the component is accommodated is able to be secured by decreasing the thickness of the outside region 140. Thus, the heat dissipation of the electronic component is able to be more effectively performed, and a body size in the axial direction is able to be reduced.

As illustrated in FIG. 18, the inside region 130 includes an inside wall 131 and a rib 132. The inside wall 131 and the rib 132 are provided in the heat sink bottom surface 102. The inside wall 131 extends axially downward at the radially inside end. The rib 132 extends radially outward from the inside wall 131. A plurality of ribs 132 are provided, and circumferentially arranged at equal intervals. The plurality of ribs 132 extend radially with the center axis A as the center. Rigidity of the inside region 130 of the heat sink 100 is able to be increased by the inside wall 131 and the rib 132, so that durability against stress and the like supporting the shaft 41 is able to be improved when the heat sink 100 holds the bearing 43. By radially extending the rib 132, heat capacity of the heat sink 100 is able to be increased, and the heat is able to be easily conducted radially outward.

The outside region 140 includes the heat sink through-holes 110U, 110V, and 110W into which the coil wire C is inserted. The bottom surface of the outside region 140 is located axially above the bottom surface of the inside region 130.

As illustrated in FIG. 1, the bus bar holder 54 is axially located below the outside region 140, and radially overlaps the inside region 130. In other words, a recess recessed axially upward is provided on the radial outside of the heat sink 100 and the bottom surface, and the bus bar B is accommodated in the recess.

In the first exemplary embodiment, many heat generating elements (elements, such as an FET, which have a relatively large calorific value) are disposed in a center portion (radially inside) of the circuit board 70. For this reason, a heat dissipation effect is enhanced by increasing the thickness of the inside region 130 located at the center portion of the heat sink 100 opposed to the circuit board 70.

On the other hand, the coil wire C drawn out from the coil 53 of the stator 50 is connected to the outside (radially outside) of the circuit board 70, but the heat generating element is not disposed outside the circuit board 70. The thickness of the outside region 140 is decreased, and the bus bar holder 54 is disposed, which allows an axial height to be prevented. The heat sink 100 covers the top surface and the side surface of the bus bar, which allows the heat sink 100 to absorb the radiant heat of the bus bar during driving.

The outside wall 150 surrounds the radial outside of the bus bar holder 54. The axial thickness of the outside wall 150 is greater than the axial thickness of the inside region 130. At least a portion of the outside wall 150 is exposed to the outside. The outside wall 150 includes a place having the largest axial thickness in the heat sink 100, so that the heat dissipation effect is able to be further enhanced.

As illustrated in FIG. 17, the second positioning recess 176 is provided in the heat sink top surface 101 of the heat sink main body 103 for the purpose of the positioning with respect to the circuit board 70. A plurality of second positioning recesses 176 are provided, and are circular recesses. A positioning member such as a positioning pin is inserted into the second positioning recess 176 of the heat sink 100 and the positioning hole 76 (see FIG. 15) of the circuit board 70 to perform the positioning.

A fixing hole 177 is made in the heat sink main body 103 in order to fix the heat sink main body 103 to the circuit board 70. The fixing hole 177 is a circuit board abutment that abuts axially on the circuit board 70. A plurality of fixing holes 177 are made, and are circular holes. A fixing member such as a fixing pin and a screw is inserted into the fixing hole 177 of the heat sink 100 and the fixing hole 77 (see FIG. 15) of the circuit board to fix the circuit board 70 to the heat sink 100.

As described above, the heat sink 100 and the circuit board 70 are positioned using the positioning member, and fixed by the fixing member. After the circuit board 70 and the heat sink 100 are fixed, the positioning member is removed.

Because the heat sink 100 and the circuit board 70 abut on each other, the fixing hole 177 protrudes axially upward with respect to the exposed surface 122. That is, in the first exemplary embodiment, the fixing hole 177 is located in the first contact surface.

As illustrated in FIG. 17, the plurality of heat sink through-holes 110 and the plurality of fixing holes 177 are circumferentially provided at intervals. The two fixing holes 177 are circumferentially made separated from the heat sink through-holes 110U, 110W located at both circumferential ends among the plurality of heat sink through-holes 110.

As illustrated in FIG. 18, the first positioning hole 178 and the first positioning recess 179 or the first positioning protrusion (not illustrated) are provided in the heat sink protrusion 104 for the purpose of the positioning with respect to the connector 200. The first positioning recess is a notched recess.

As illustrated in FIG. 1, the connector 200 is disposed so as to be adjacent to the housing 10, and electrically connects the circuit board 70 and the outside of the motor 1. The connector 200 of the first exemplary embodiment is disposed radially outside the housing 10, extends axially downward, and accommodates the connector pin 81, which is a conductor extending axially downward from the circuit board 70, therein.

The top surface of the connector 200 is located lower than the heat sink top surface 101 of the heat sink 100, and the connector 200 and the circuit board 70 overlap each other when viewed from the axially upper side.

Figure 25:
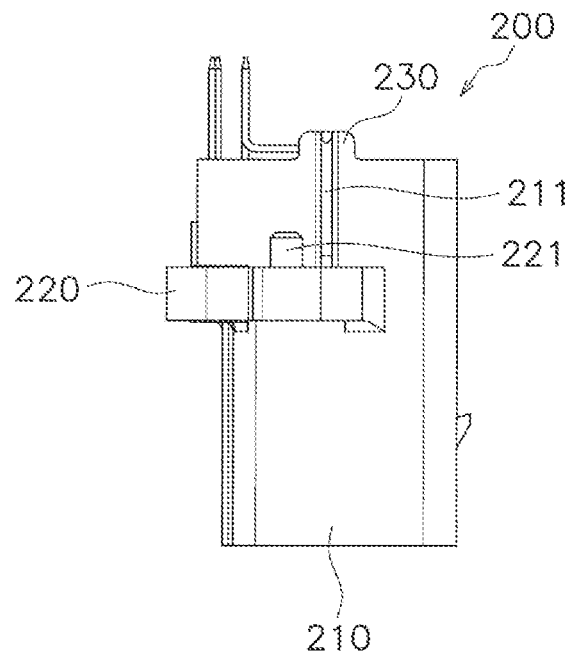
FIG. 25 is a side view illustrating a connector of the first exemplary embodiment of the present disclosure.
Figure 26:
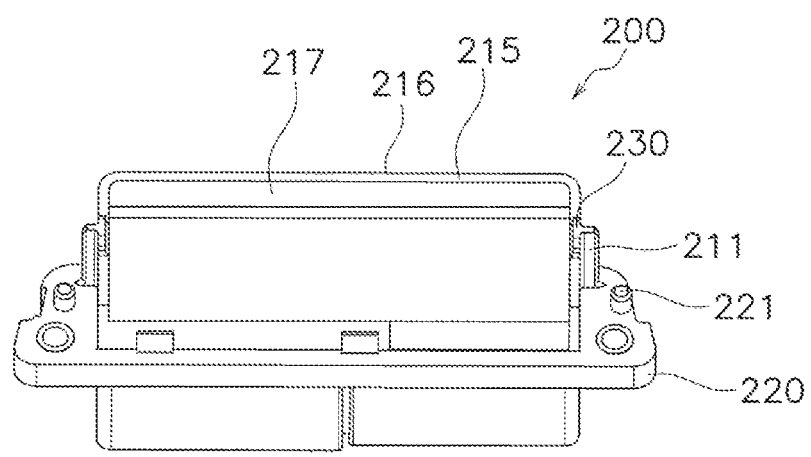
FIG. 26 is a perspective view illustrating the connector of the first exemplary embodiment of the present disclosure.

As illustrated in FIGS. 25 and 26, the connector 200 includes a connector body 210 extending axially, a connector flange 220 extending radially outward from the outside surface of the connector body 210, and a connector protrusion 230 extending axially upward from the top surface of the connector body 210.

Figure 27:
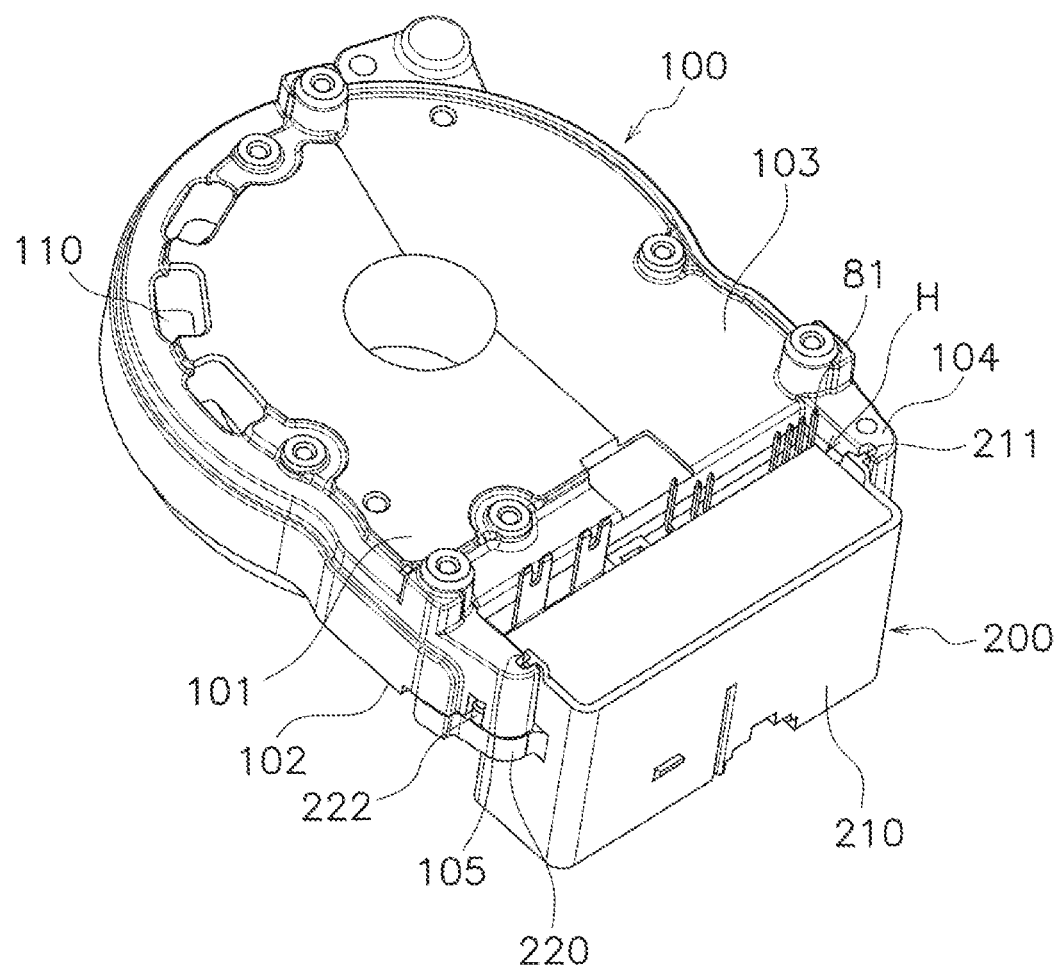
FIG. 27 is a perspective view illustrating the heat sink and the connector of the first exemplary embodiment of the present disclosure.

As illustrated in FIG. 27, in the case that the cavity H is defined by the heat sink main body 103 and the two heat sink protrusions 104, at least a portion of the connector body 210 is located in the cavity H.

The connector body 210 is located in the outside surface, and includes a body protrusion 211 or a body recess (not illustrated) extending axially. The body protrusion 211 extends axially from the connector flange 220 to the connector protrusion 230.

As illustrated in FIGS. 6 and 26, the connector body 210 further includes a connector protrusion 215, which is located in the radially outer end region and extends axially. The connector protrusion 215 is an outer edge including a connector outer end edge 216 on the radially outside. The term "connector outer end edge 216" means the outer end (the end of the connector 200).

The connector body 210 further includes a pocket recess 217 defined by the radially inside surface of the connector protrusion 215 on the radial inside of the connector protrusion 215. The pocket recess 217 stores dust invading from the outside.

The connector flange 220 is located in an axial center portion of the connector body 210. The center portion means a predetermined range from the center (for example, within about ⅓ from the center of the axial height). Consequently, even if external force is applied to the connector 200, the durability is able to be improved.

As illustrated in FIGS. 25 and 26, a fitter 221 is provided in the top surface of the connector flange 220 for the purpose of the positioning with respect to the heat sink 100. The fitter 221 is fitted in the first positioning hole 178 and the first positioning recess 179 or the first positioning protrusion (not illustrated). The fitter 221 of the first exemplary embodiment is a protrusion extending upward.

The connector protrusion 230 extends upward from the top surface of the connector body 210. The connector protrusion 230 may integrally be molded with the connector body 210, or may be molded separated from the connector body 210.

As illustrated in FIG. 6, the connector protrusion 215 and the cover recess 33 are fitted to each other with the gap interposed therebetween. The connector 200 has a substantially rectangular shape in planar view. The connector protrusion 215 and the cover recess 33 extend along the longitudinal direction of the connector 200.

As illustrated in FIG. 1, the connector protrusion 230 and the cover step 35 are fitted to each other with the gap interposed therebetween. The radially outside corner of the connector protrusion 230 and the step of the cover step 35 are fitted to each other while opposed to each other.

In the first exemplary embodiment, the fitting of the outer end region R of the cover 30 and the connector 200 is described by taking the structure in FIG. 6 as an example. Alternatively, the fitting of the outer end region R may be a structure in FIGS. 7 to 9.

In the structure of FIG. 7, the connector protrusion 215 is not constructed with the connector outer end edge 216, but extends axially upward from a position radially spaced from the connector outer end edge 216. The fitting of the connector protrusion 215 and the cover recess 33 with the gap interposed therebetween is located in the outer end region R that does not include the cover outer end edge 31 and the connector outer end edge 216.

In the structure of FIG. 8, the connector 200 further includes a step 218 extending radially inward from the upper end of the radially inside surface of the pocket recess 217. The connector protrusion 215 and the cover recess 33 are fitted to each other with the gap interposed therebetween, and the recess 219 including the pocket recess 217 and the step 218 and the cover protrusion 34 are fitted to each other with the gap interposed therebetween.

In the structure of FIG. 9, the connector 200 includes the pocket recess 217 formed by the radially outside surface of the connector protrusion 215 on the radial outside of the connector protrusion 215. A portion of the cover recess 33 is opposed to the pocket recess 217, and the remaining part of the cover recess 33 is fits to the connector protrusion 215 with the gap interposed therebetween. The fitting of the connector protrusion 215 and the cover recessed portion 33 with the gap interposed therebetween is located in the outer end region R that does not include the cover outer end edge 31 and the connector outer end edge 216.

As described above, the motor 1 of the first exemplary embodiment has a labyrinthine structure in which the cover 30 and the connector 200 are fitted to each other into the uneven shape and with the gap interposed therebetween. Consequently, the motor has a dustproof effect, and is able to be easily assembled.

As illustrated in FIG. 27, the connector 200 contacts with the bottom surface of the heat sink protrusion 104. Specifically, the heat sink protrusion 104 is disposed on the connector flange 220 such that a flange top surface 222 of the connector flange 220 and the heat sink bottom surface 102 of the heat sink protrusion 104 contact with each other.

As illustrated in FIG. 17, in the case that the plurality of heat sink protrusions 104 are formed at intervals, the connector flange 220 contacts with each of the bottom surfaces of the plurality of heat sink protrusions 104.

The body protrusion 211 and the heat sink recess 105 are fitted to each other with the gap interposed therebetween. A body recess may be provided instead of the body protrusion 211, a heat sink protrusion may be provided instead of the heat sink recess, and the body recess and the heat sink protrusion may be fitted to each other with the gap interposed therebetween. As described above, the assembly is facilitated when the connector 200 and the heat sink 100 are fitted to each other into the uneven shape with the gap interposed therebetween.

The body protrusion or the body recess fitted to each other the gap interposed therebetween and the heat sink recess or the heat sink protrusion extend axially.

The fitter 221 of the connector is fitted to the first positioning hole 178 (see FIGS. 17 and 18) of the heat sink 100 and the first positioning recess 179 (see FIG. 18) or the first positioning protrusion (not illustrated), thus positioning the heat sink 100 and the connector 200. In the first exemplary embodiment, the protrusion that is the fitter 221 provided in the top surface of the connector flange 220 is fitted in the round hole that is the first positioning hole 178 of the heat sink protrusion 104 and the notch recess that is the first positioning recess 179.

The heat sink 100 and the connector 200 may be positioned by fitting the heat sink 100 and the connector 200 to each other, and the shapes of the heat sink 100 and the connector 200 are not limited.

As described above, in the first exemplary embodiment, the structure in which the cover 30 and the connector 200 are fixed to the heat sink 100 by way of example. Alternatively, in another motor of the present disclosure, the heat sink and the connector may be fixed to the cover. In the latter case, the assembly is able to be easily performed using the structure in which the heat sink and the connector are fitted to each other with the gap interposed therebetween.

In the first exemplary embodiment, the holder including the plurality of through-holes into which the coil wire is inserted is the heat sink 100. Specifically, the holder of the first exemplary embodiment also acts as a holder holding the coil wire inserted into the through-hole, a bearing holder holding the bearing, a heat sink releasing the heat generated from the heat generating element of the controller to the outside, and a holder holding the connector. However, the holder of the present disclosure may be separated from the heat sink 100.

In the first exemplary embodiment, the heat sink 100 also defines and functions as the holder holding the bearing 43 by way of example. Alternatively, the heat sink of the present disclosure may be a separated from the bearing holder.

In the first exemplary embodiment, by way of example, the cavity H includes the cavity for the conductor from the connector and the heat sink through-hole 100 for the coil wire, and the heat sink through-hole 100 has the shape in which the entire circumference is surrounded. However, the through-hole of the heat sink of the present disclosure may not necessarily have the shape in which the entire circumference is surrounded. That is, the heat sink through-hole of the present disclosure may have the shape in which the entire circumference is surrounded or a shape in which a portion of the entire circumference is surrounded, for example, a notch including a slit.

Figure 28:
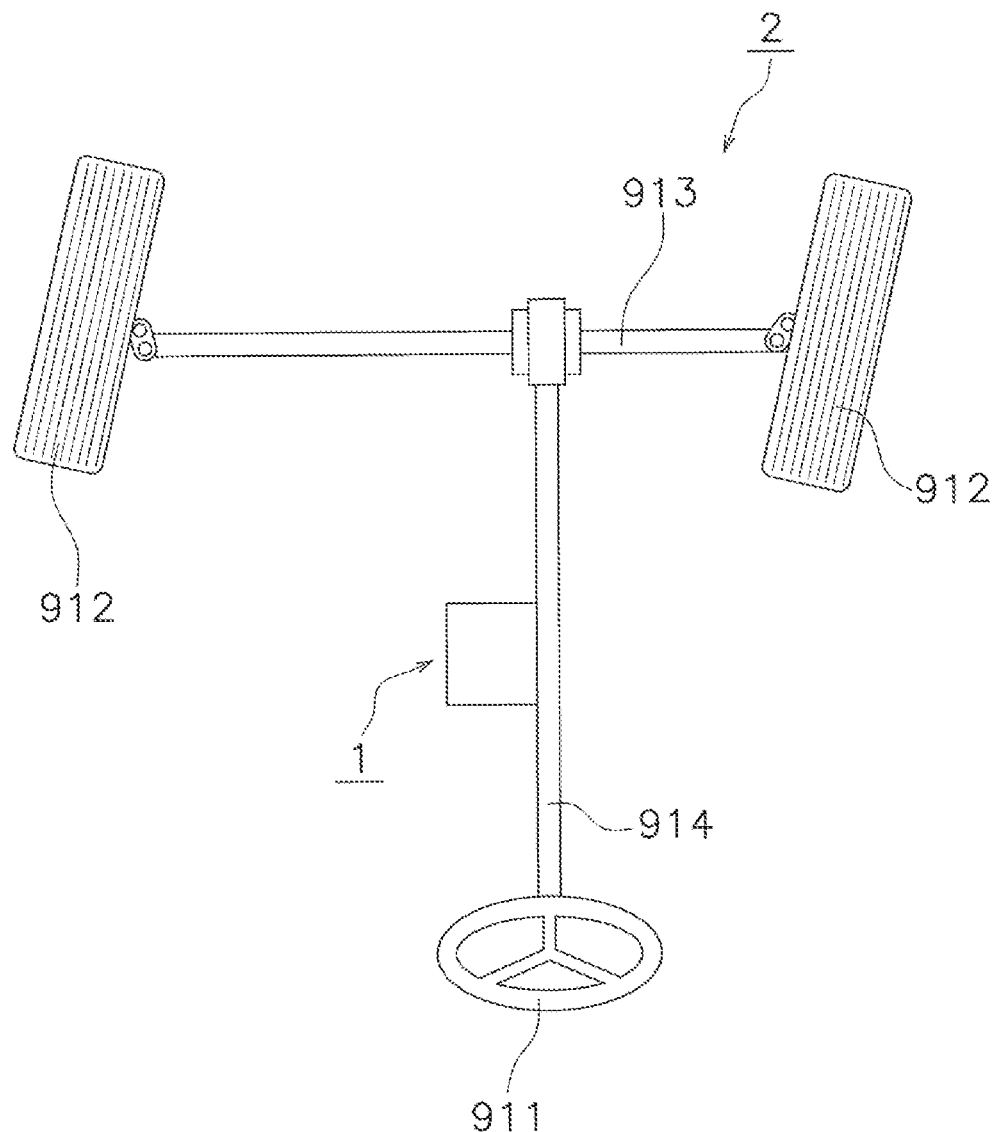
FIG. 28 is a schematic diagram illustrating an electric power steering device according to a second exemplary embodiment of the present disclosure.

A second exemplary embodiment of a device including the motor 1 according to the first exemplary embodiment will be described with reference to FIG. 28. An example in which the motor 1 is mounted on an electric power steering device will be described in the second exemplary embodiment.

The electric power steering device 2 is mounted on a steering mechanism of a wheel of an automobile. The electric power steering device 2 of the second exemplary embodiment is a column type power steering device that directly reduces steering force by power of the motor 1. The electric power steering device 2 includes the motor 1, a steering axle 914, and an axle 913.

The steering axle 914 transmits input from the steering 911 to the axle 913 including wheels 912. The power of the motor 1 is transmitted to the axle 913 through a ball screw. The motor 1 used in the column electric power steering device 2 is provided in an engine compartment (not illustrated). In the case of a column power steering apparatus, because a waterproof structure is able to be provided in the engine compartment, there is no need to provide the waterproof structure in the motor. On the other hand, although dust may invade into the engine compartment, the dust is able to be prevented from invading into a motor body because the motor 1 has a dust-proof structure.

The electric power steering device 2 of the second embodiment includes the motor 1 of the first exemplary embodiment. For this reason, the electric power steering device 2 that obtains the effect identical to that of the first exemplary embodiment can be obtained.

The electric power steering device 2 is cited as an example of the method for using the motor 1 of the first exemplary embodiment. However, but the method for using the motor 1 is not limited, but can be used in a wide range such as a pump and a compressor.

It should be considered that the disclosed embodiments are an example in all respects and are not restrictive. The scope of the present disclosure is not limited to the exemplary embodiments described above but is indicated by the claims, and the scope of the present disclosure includes the meaning equivalent to the claims and all changes within the scope.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor including a shaft extending axially;
a stator surrounding a radial outside of the rotor and including a coil defined by a wound coil wire;
a holder on an axially upper side of the stator, the coil wire being inserted into the holder, the holder including a plurality of through-holes extending axially and a heat sink; and
a circuit board on the axially upper side of the holder, an electronic component being mounted on the circuit board; wherein
the plurality of through-holes are located in a region where a center angle centered on the shaft is less than or equal to 180 degrees when the holder is viewed from the axially upper side;
the stator includes two systems including two pairs of a U-phase, a V-phase, and a W-phase of coils;
each of the plurality of through-holes respectively contains only multiple in-phase coil wires of a same single one of the U-phase, the V-phase, and the W-phase of coils;
the plurality of through-holes are spaced apart from each other to separate each of the U-phase, the V-phase, and the W-phase of coils;
the circuit board includes a first region where a power supply is mounted and a second region where a controller is mounted;
the first region and the second region are provided at different locations in a circumferential direction of the circuit board such that the first region and the second region do not overlap when viewed in a plan view of the circuit board; and
the plurality of through-holes are located in the first region when viewed from the axially upper side.

2. The motor according to claim 1, wherein the first region is a region where the center angle centered on the shaft is less than or equal to 180 degrees when viewed from the axial upper side.

3. The motor according to claim 1, wherein
a number of slots of the coil is greater than or equal to 6; and
the center angle is less than or equal to (360 degrees/the number of slots)×3 degrees.

4. The motor according to claim 1, wherein the plurality of through-holes are circumferentially located at intervals.

5. The motor according to claim 1, wherein
the heat sink includes a contact surface contacting directly with the circuit board or the electronic component or contacting indirectly with the circuit board or the electronic component with a heat dissipator interposed therebetween and an exposed surface that does not contact with another member;
the exposed surface is located circumferentially outside the plurality of through-holes; and
a boundary between the contact surface and the exposed surface is located circumferentially.

6. The motor according to claim 1, wherein
the heat sink includes a circuit board abutment abutting axially on the circuit board; and
the plurality of through-holes and the circuit board abutment are provided with an interval in a circumferential direction.

7. The motor according to claim 6, wherein
a plurality of the circuit board abutments are provided; and
the two circuit board abutments and the through-holes located at both ends in the circumferential direction among the plurality of through-holes are provided with an interval in the circumferential direction.

8. An electric power steering device comprising the motor according to claim 1.

* * * * *